(12) United States Patent
Kano et al.

(10) Patent No.: US 8,368,527 B2
(45) Date of Patent: Feb. 5, 2013

(54) ELECTRONIC DEVICE CONTROLLING SYSTEM AND CONTROL SIGNAL TRANSMITTING DEVICE

(75) Inventors: Hidekazu Kano, Kanagawa (JP); Akinori Ohta, Kanagawa (JP); Iwao Matsuura, Kanagawa (JP); Akihiro Miyashita, Kanagawa (JP)

(73) Assignee: Panasonic Corporation, Osaka (JP)

( * ) Notice: Subject to any disclaimer, the term of this patent is extended or adjusted under 35 U.S.C. 154(b) by 584 days.

(21) Appl. No.: 11/813,131

(22) PCT Filed: Mar. 8, 2006

(86) PCT No.: PCT/JP2006/304502
§ 371 (c)(1),
(2), (4) Date: Jun. 29, 2007

(87) PCT Pub. No.: WO2006/098203
PCT Pub. Date: Sep. 21, 2006

(65) Prior Publication Data
US 2009/0309751 A1 Dec. 17, 2009

(30) Foreign Application Priority Data
Mar. 14, 2005 (JP) .................................. 2005-071422

(51) Int. Cl.
*H04Q 1/30* (2006.01)
(52) U.S. Cl. ........................................ 340/531; 340/500
(58) Field of Classification Search ............ 340/5.1–5.2, 340/500, 5.64–5.65, 531–532
See application file for complete search history.

(56) References Cited

U.S. PATENT DOCUMENTS

| 5,555,172 | A  | * | 9/1996  | Potter ........................ 455/456.1 |
| 6,072,391 | A  | * | 6/2000  | Suzuki et al. ................. 340/468 |
| 6,374,145 | B1 | * | 4/2002  | Lignoul ......................... 700/17 |
| 6,636,733 | B1 | * | 10/2003 | Helferich .................. 455/412.2 |
| 6,690,291 | B1 | * | 2/2004  | Cardillo et al. ............... 340/901 |
| 6,694,143 | B1 | * | 2/2004  | Beamish et al. ............ 455/456.1 |
| 6,792,287 | B1 | * | 9/2004  | Tuomela et al. ........... 455/556.1 |
| 6,861,944 | B1 | * | 3/2005  | Hoepelman .................... 340/5.1 |
| 7,429,919 | B2 | * | 9/2008  | Silic et al. .................. 340/539.1 |
| 7,551,893 | B2 | * | 6/2009  | Fukumoto et al. ........... 455/41.2 |
| 2002/0030585 | A1 | * | 3/2002  | Doi et al. ..................... 340/5.64 |

(Continued)

FOREIGN PATENT DOCUMENTS

| CN | 1561649 A | 1/2005 |
| JP | 2001-077735 | 3/2001 |

(Continued)

*Primary Examiner* — Brian Zimmerman
*Assistant Examiner* — James Yang
(74) *Attorney, Agent, or Firm* — Pearne & Gordon LLP

(57) ABSTRACT

An electronic device is provided which executes a function useful in that place without a user in possession of the electronic device being intentional, and which does not receive a signal without providing a special setting if the function is not useful even if the place and the device are the same. There are an electronic device A and an electronic device each having a human body communication function. In a case where a user is holding the electronic device A, the electronic device B outputs a control signal for causing the electronic device A to execute a function aimed to eliminate a danger or an annoyance to the surroundings occurring because of holding it, whereas, due to the fact that the user has the electronic device, the electronic device A receives the control signal irrespective of the user's intention and executes a function based on the control signal.

11 Claims, 22 Drawing Sheets

U.S. PATENT DOCUMENTS

| | | | |
|---|---|---|---|
| 2003/0014990 A1* | 1/2003 | Fukasaku et al. | 62/228.3 |
| 2003/0028781 A1* | 2/2003 | Strongin | 713/182 |
| 2003/0096593 A1* | 5/2003 | Naboulsi | 455/411 |
| 2003/0116927 A1* | 6/2003 | Quigg | 280/5.22 |
| 2003/0134627 A1 | 7/2003 | Himmel et al. | |
| 2004/0056758 A1* | 3/2004 | Schwartz | 340/5.2 |
| 2006/0208577 A1* | 9/2006 | Richter et al. | 307/326 |
| 2006/0239419 A1* | 10/2006 | Joseph et al. | 379/67.1 |

FOREIGN PATENT DOCUMENTS

| | | |
|---|---|---|
| JP | 2001-144661 | 5/2001 |
| JP | 2002-152145 | 5/2002 |
| JP | 2003-134559 | 5/2003 |
| JP | 2003-190302 | 7/2003 |
| JP | 2004-357195 | 12/2004 |
| JP | 2005-005787 | 1/2005 |

* cited by examiner

FIG. 1
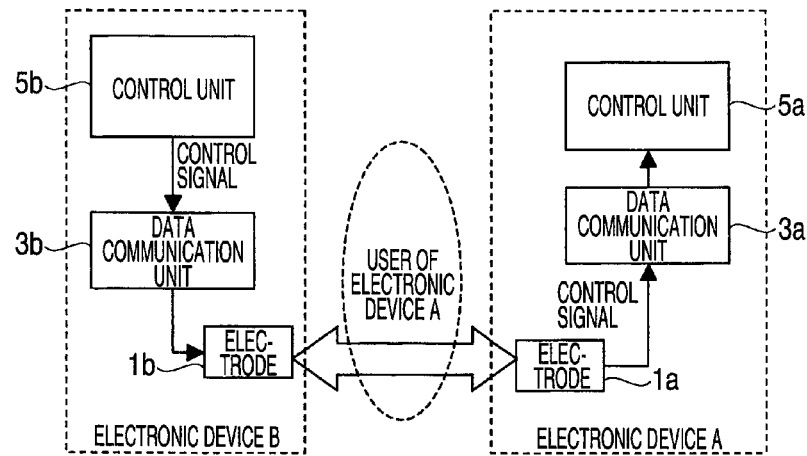
FIG. 2 (a)
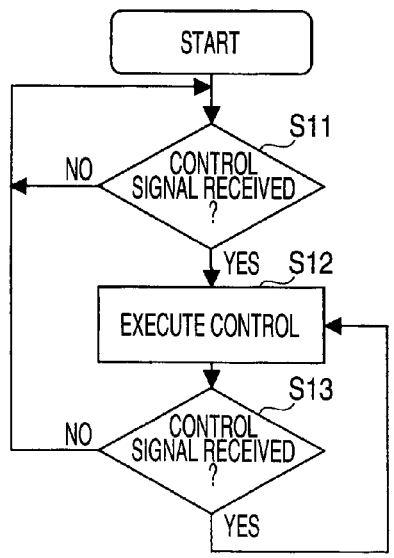
FIG. 2 (b)
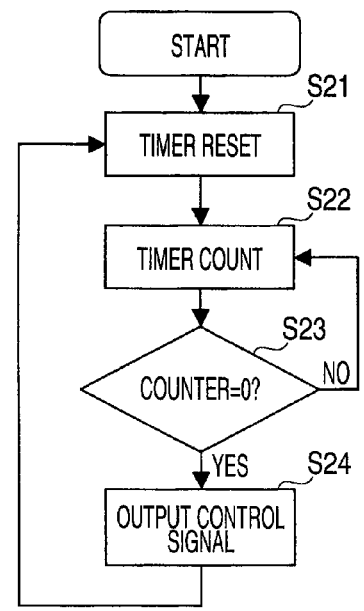
FIG. 3 (a)
| COMMAND |
|---|
| INHIBIT SCREEN DISPLAY |
FIG. 3 (b)
| SUBJECT DEVICE | COMMAND | PRIORITY | DATA |
|---|---|---|---|
| MOBILE GAME MACHINE PDA | CHARACTER DISPLAY | 2 | CHARACTER DATA |

*FIG. 9 (a)*      *FIG. 9 (b)*
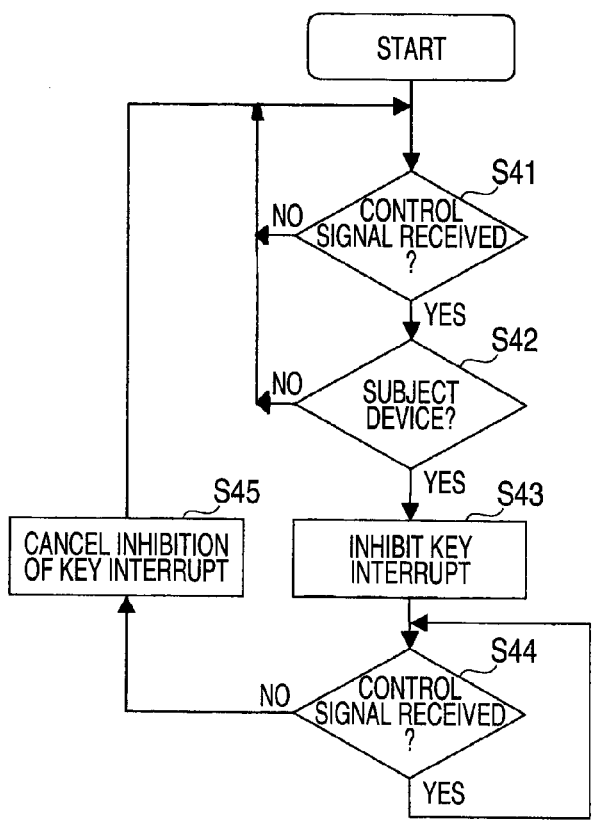
*FIG. 10*
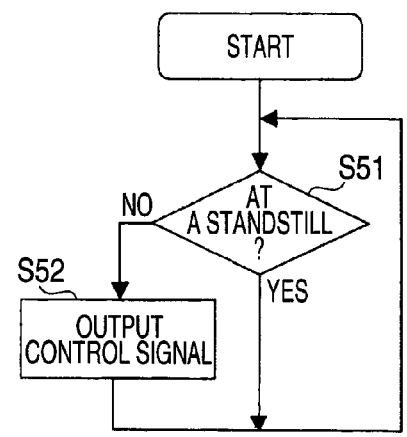

FIG. 14 (a)
FIG. 14 (b)
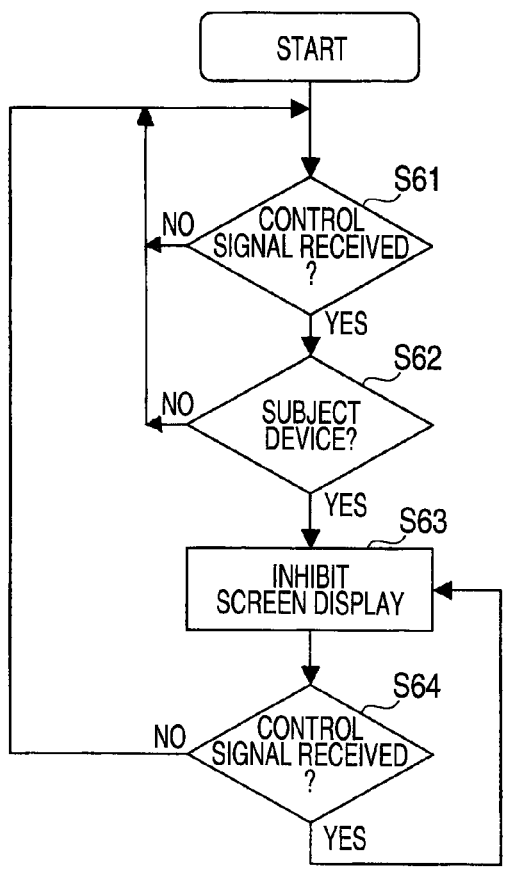
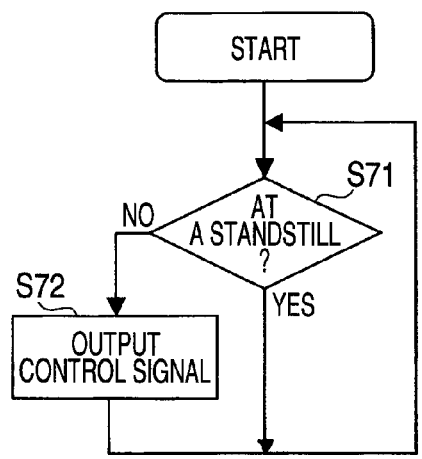
FIG. 15
| SUBJECT DEVICE | COMMAND |
|---|---|
| MOBILE PHONE<br>MOBILE GAME<br>DEVICE<br>PDA | INHIBIT SCREEN DISPLAY |

| SUBJECT DEVICE | COMMAND |
|---|---|
| MOBILE PHONE<br>MOBILE GAME DEVICE<br>PDA | INHIBIT SCREEN DISPLAY |

| SUBJECT DEVICE | COMMAND |
|---|---|
| MOBILE PHONE<br>MOBILE GAME<br>DEVICE<br>PDA | INHIBIT SCREEN DISPLAY |

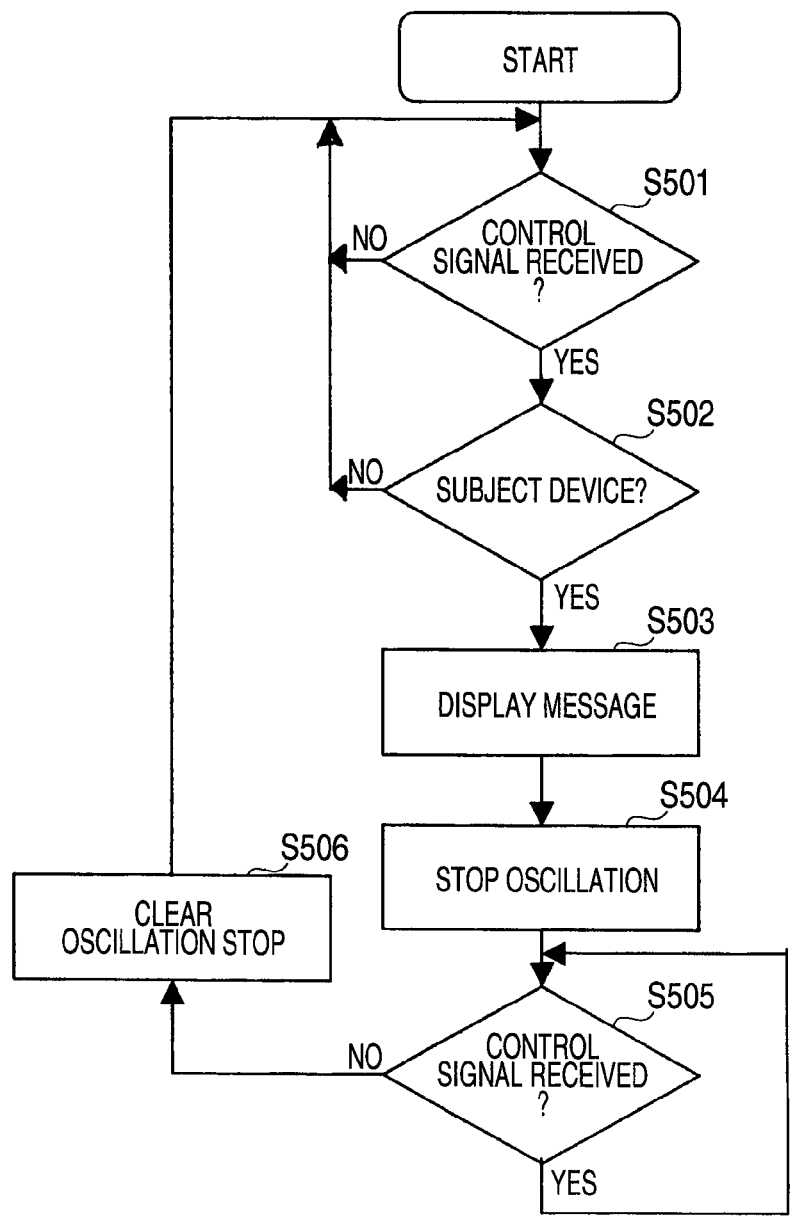

| SUBJECT DEVICE | COMMAND | DATA |
|---|---|---|
| MOBILE PHONE, PDA, MOBILE GAME DEVICE | DANGER DISPLAY COMMAND | - |

FIG. 32
| SUBJECT DEVICE | COMMAND | DATA |
|---|---|---|
| MOBILE PHONE, PDA, MOBILE GAMED EVICE | DISPLAY COMMAND | DANGER MESSAGE |
FIG. 33
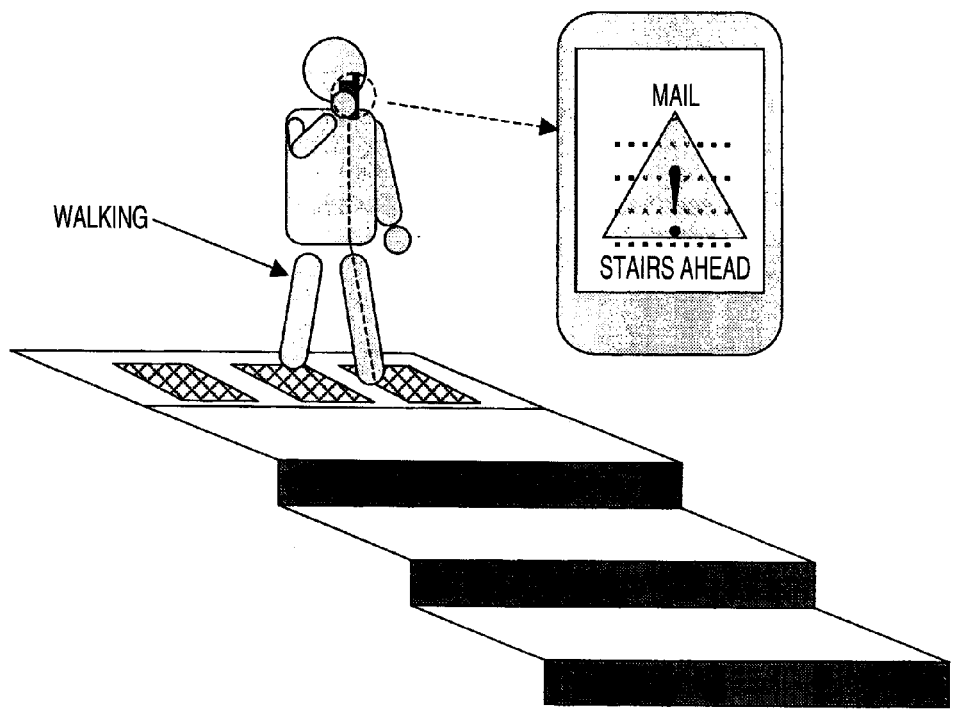
FIG. 34
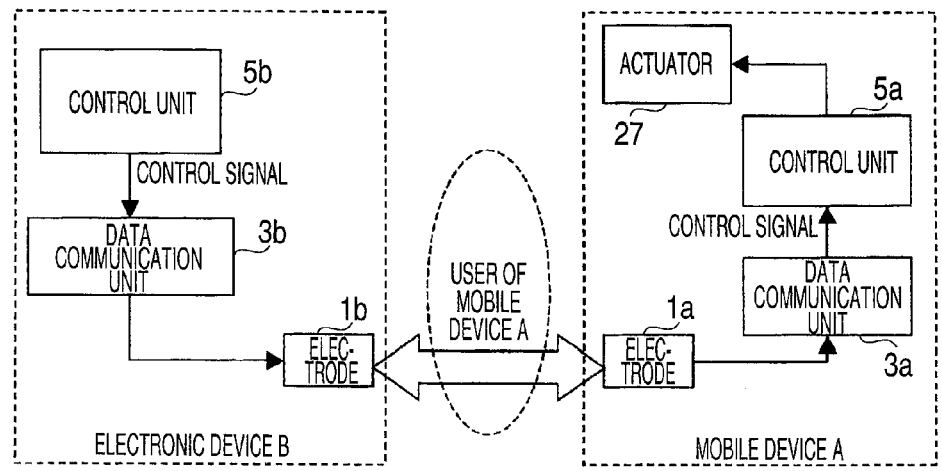

FIG. 35
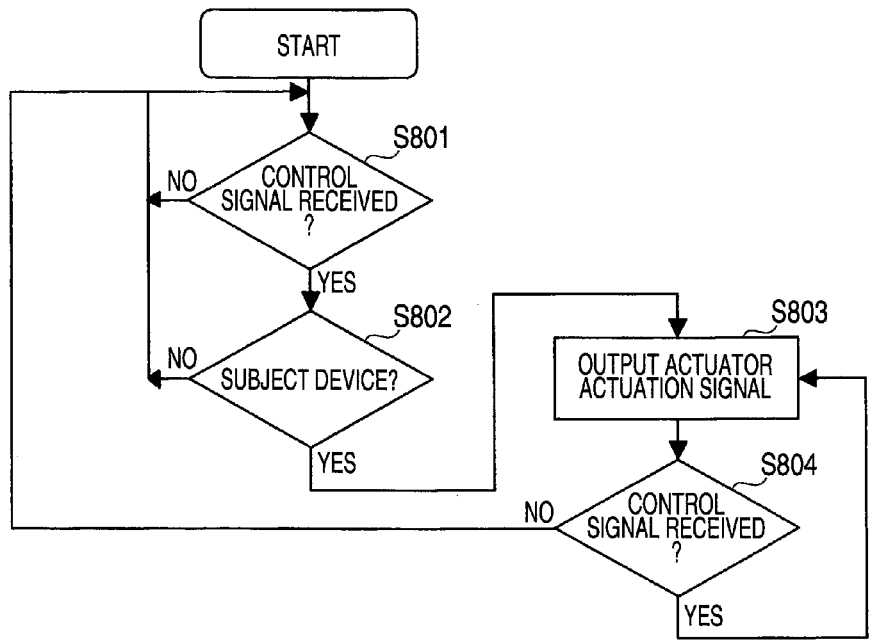
FIG. 36
| SUBJECT DEVICE | COMMAND | DATA |
|---|---|---|
| MOBILE PHONE, MOBILE GAME DEVICE | ACTUATE ACTUATOR | — |
FIG. 37
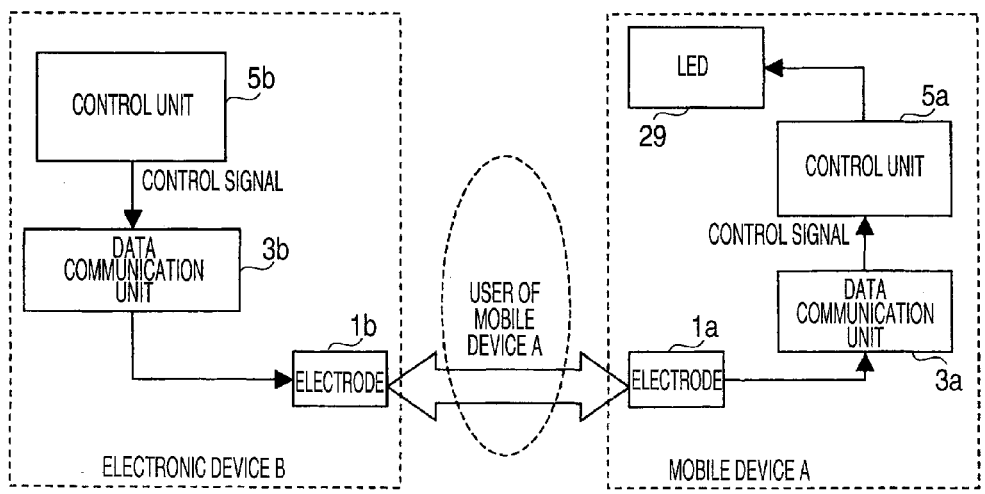

ELECTRONIC DEVICE CONTROLLING SYSTEM AND CONTROL SIGNAL TRANSMITTING DEVICE

TECHNICAL FIELD

The present invention relates to the control of an electronic device making use of a human body communication function.

BACKGROUND ART

Conventionally, as one method of carrying out data communication between electronic devices, a method called human body communication in which data communication is carried out by using a human body as a transmission route has been proposed. For example, one disclosed in JP-A-2001-77735 is known. According to this, a technique is disclosed in which human body communication is carried out stably by bringing two electrodes into contact with a human body or by electrostatically coupling them and by measuring and controlling the amount of electric current flowing across the electrodes.

In addition, JP-A-2002-152145 discloses a human body communication technique is disclosed which makes use of a change in the refractive index when an electro-optical crystal connected to a transceiver antenna is electromagnetically coupled to a transmitted electric field.

As a technique making use of such a human body communication technique, one disclosed in JP-A-2001-144661 is known. According to the technique disclosed therein, it is stated that as a human body communication function is mounted on a wearable device, authentication processing can be carried out with respect to a service providing terminal by communication via a human body.

Alternatively, in a technique disclosed in JP-A-2003-190302, it is stated that a human body communication function is mounted on a remote controller and a health appliance such as a massage chair, and if the user operates the remote controller in a state of being seated in the massage chair, a control signal is transmitted to the massage chair through the human body, so that a cord based on wired communication is not required, and wireless communication need not be carried out, facilitating the ease of use and making it possible to attain reduction in cost.

DISCLOSURE OF THE INVENTION

However, in the technique disclosed in JP-A-2001-144661, data and information which the user wishes to obtain are utilized only for actively effecting communication according to the user's intention. The user's intention to obtain certain data or send certain data is first present there, and according to that intention the user effects the transmission and reception of data by touching the electronic device or touching a person having the electronic device. However, the use in a situation in which the user does not intend is not assumed in this case.

In addition, the means for transmitting data to a device possessed by the user without the user being intentional is carried out by wired communication or wireless communication. However, in wired communication, it is, of course, necessary to establish a communication route beforehand, so that wired communication cannot be used in places where an environment for effecting communication is not provided. As for compact electronic devices carried by the user, wired communication cannot be used everywhere.

In addition, just as is the case with a mobile phone, wireless communication makes it possible to receive data without the user in possession of the mobile phone being intentional. In wireless communication, however, the range of communication can be specified to some extent by adjusting the intensity of radio waves, but it is impossible to clearly distinguish between a zone where communication is effected and a zone where it is not. In other words, it follows that a subject electronic device cannot be specified, and data transmission and reception are unnecessarily effected with respect to a wireless communication electronic device possessed by the user.

Accordingly, an object of the invention is to provide an electronic device wherein when the possessor of an electronic device is holding the electronic device in his or her hand for the purpose of such as operation, the electronic device receives a signal from the outside without the user in possession of it being intentional, and thereby executes a function useful or necessary for the possessor or receives information or a service. Another object of the invention is to provide an electronic device controlling system and a control signal transmitting device wherein in a case where the reception of a signal is useful or necessary for the possessor, the electronic device is made capable of receiving the signal, whereas in a case where it is not, the electronic device does not receive the signal without providing a special setting.

Means for Overcoming the Problems

An electronic device controlling system in accordance with the invention comprises: a first electronic device including a first data communication unit for effecting the reception of a control signal, a first electrode for receiving the control signal from an outside for the first data communication unit, and a first control unit for effecting control on the basis of the control signal; and a second electronic device including a second control unit, a second data communication unit for effecting the transmission of a control signal on the basis of control by the second control unit, and a second electrode for sending the control signal to the outside for the second data communication unit. When the first electrode and the second electrode are electromagnetically coupled to each other through a human body, the control signal can be transmitted from the second electronic device to the first electronic device, and the first electronic device is controlled on the basis of the control signal, while the second electronic device sends the control signal to the outside at least predetermined intervals irrespective of a position of the first electronic device.

According to the above-described configuration, even in a case where a user who possesses and is carrying the first electronic device, for example, has unintentionally approached the second electronic device, the first electronic device is capable of receiving a control signal from the second electronic device and of voluntarily changing its state. In the situation concerned, the user is able to unintentionally receive useful or necessary information or service.

As the first electronic device, it is possible to use one which includes a system register, a recording unit for recording information of the system register, and a timer. In this case, upon receiving the control signal, the first electronic device stores the information of the system register in the recording unit, starts counting by the timer, and effects control on the basis of the control signal, and in a case where an ensuing control signal is not received until the counting by the timer is completed, the first electronic device resets a value of the system register to a stored value.

According to the above-described configuration, when a control has been received, control based on that control signal can be effected, and if the control signal is interrupted, that control can be stopped, and it is possible to resume the processing prior to the reception of the control signal.

In addition, in a case where the first electronic device is a mobile electronic device having an operating unit, the first control unit can be configured to change a state of the operating unit on the basis the control signal. Meanwhile, in a case where the first electronic device is a mobile electronic device having a display unit, the first control unit can be configured not to output data to the display unit on the basis the control signal.

Furthermore, as the first electronic device, it is possible to use a mobile phone which includes a wireless communication unit having a wireless transceiver portion and a modem portion for effecting the demodulation of the signal received by the transceiver portion and the modulation of the signal transmitted from the wireless transceiver portion, a message recording unit for storing a received voice message, and a fixed response message recording unit for storing a predetermined fixed response message. In this case, the first control unit determines on the basis of the signal from the wireless communication unit whether or not the mobile phone has received a voice call, and if the first control unit determines that the mobile phone has received a voice call, and the first data communication unit has received the control signal, the first control unit transmits the fixed response message to another party through the wireless communication unit on the basis of the control signal, and stores the voice message from the other party in the message recording unit.

In the above-described configuration, it is possible to provide a mobile phone wherein in a case where the mobile phone has received an incoming call while the user is driving, for example, the mobile phone is automatically set to a voice mail mode, so that the prevention of an accident can be expected.

In addition, the second electronic device can be installed in a moving body which has a motor and is movable by being driven by a person. Further, the second electronic device can be further provided with a speed detecting unit and a speed determining unit. In this case, the speed detecting unit outputs speed information of the moving body to the speed determining unit, whereas the speed determining unit determines on the basis of the speed information whether or not the moving body is moving, and has a function whereby if it is determined that the moving body is moving, the speed determining unit instructs the second control unit to output the control signal from the first data communication unit. Here, the second electrode can be installed at least any one of a seating portion of a driver's seat of the moving body, a backrest portion of the driver's seat, a safety belt of the driver's seat, a brake pedal, a steering wheel, and a gear.

In the above-described configuration as well, while the user having the first electronic device is driving a moving body, for example, the first electronic device can be controlled, and the prevention of an accident can be expected.

Further, the second electronic device can be installed in a bicycle and can be provided with a generator unit. In this case, the generator unit is connected to a wheel of the bicycle, and supplies electric power to the second control unit by the rotation by the rotation of the wheel, and the second control unit outputs the control signal while the electric power is being supplied thereto. Here, the second electrode can be installed at least any one of a saddle, a steering handlebar, a brake, and a pedal of the bicycle.

In addition, as the first electronic device, it is possible to use a mobile electronic device having an audio processing unit and a speaker. In this case, the first control unit stops an audio output from the audio processing unit to the speaker on the basis of the control signal. Here, the second electronic device can be installed in a body of public transport. The second electrode can be installed at least any one of a seating portion of a seat, a backrest portion, a handrail, a strap, and a floor of the body of public transport.

In addition, the second electronic device can be installed in a public place such as a movie house or a theater. In this case, the second electrode can be installed at least any one of a seating portion of a seat, a backrest portion, and a floor of the movie house or the theater.

In addition, as the first electronic device, it is possible to use a mobile phone having a wireless communication unit which includes a wireless transceiver portion and a modem portion for effecting the demodulation of the signal received by the transceiver portion and the modulation of the signal transmitted from the wireless transceiver portion. In this case, it can be so configured that the first control unit does not effect wireless communication on the basis of the control signal outputted from the second electronic device. Here, the second electrode can be installed at least any one of a seating portion of a seat, a backrest portion, a handrail, a strap, and a floor of the body of public transport.

In addition, the first electronic device can be provided with an actuator, and the actuator can be mechanically connected to a housing of the first electronic device. In this case, the first control unit outputs a vibration control signal to the actuator on the basis of the control signal, and the actuator outputs a force on the basis of the vibration control signal.

In addition, a light emitting element can be installed on the first electronic device at a position where its light can be seen from an outside of the first electronic device. In this case, the first control unit outputs a light emission control signal to the light emitting element on the basis of the control signal, and the light emitting element emits light on the basis of the light emission control signal.

In addition, the second electrode can be installed in a vicinity of a dangerous area.

In the above-described configuration, when the user has approached a vicinity of a dangerous area while using the first electronic device, for example, it is dangerous if the user does not to become aware of the approach. However, the user can be notified of the approach to the dangerous area by means of the actuator or the light emitting element, making it possible to avoid the danger beforehand.

In addition, in accordance with the invention there is also provided a control signal transmitting device for issuing a control signal for controlling an electronic device possessed by a person. The control signal transmitting device includes: a control unit for effecting control on the basis of the control signal; a data communication unit for effecting the transmission of a control signal on the basis of control by the control unit; and an electrode for human body communication for sending the control signal to an outside for the data communication unit. When the electrode for human body communication and an electrode of the electronic device are electromagnetically coupled to each other through a human body, the control signal can be transmitted from the control signal transmitting device to the electronic device, and the electronic device is controlled on the basis of the control signal, while the control signal transmitting device sends the control signal to the outside at least predetermined intervals irrespective of a position of the electronic device.

By using this control signal transmitting device, even in a case where a user who possesses and is carrying the electronic device, for example, has unintentionally approached a predetermined area, the electronic device is capable of receiving a control signal from the control signal transmitting device and of voluntarily changing its state. In the situation concerned, the user is able to unintentionally receive useful or necessary information or service. The control signal transmitting device can be applied and used like the above-described second electronic device.

In addition, in accordance with the invention there is provided a method of controlling an electronic device for controlling an electronic device possessed by a person by issuing a control signal for controlling the electronic device. The controlling method includes the steps of: sending the control signal from an electrode for human body communication to an outside at least predetermined intervals irrespective of a position of the electronic device; and transmitting the control signal to the electronic device through a human body when the electrode for human body communication and an electrode of the electronic device are electromagnetically coupled to each other through the human body. In addition, a program for causing a computer to execute the steps of this method is also included in the invention.

ADVANTAGES OF THE INVENTION

According to the invention, the user of an electronic device is able to receive a control signal from the outside, execute a function useful or necessary in that situation, or receive information or a service without that person being intentional.

BRIEF DESCRIPTION OF THE DRAWINGS

FIG. 1 is a block diagram of electronic devices with a first embodiment of the invention;
FIG. 2 is a control flow diagram of the electronic devices in accordance with the first embodiment, in which the part (a) is a control flow diagram of an electronic device A, and the part (b) is a control flow diagram of an electronic device B;
FIG. 3 is a schematic of a control signal in accordance with the first embodiment;
FIG. 9 is a control flow diagram of the electronic devices in accordance with the third embodiment, in which the part (a) is a control flow diagram of the electronic device A, and the part (b) is a control flow diagram of the electronic device B;
FIG. 10 is a schematic of the control signal in accordance with the third embodiment;
FIG. 14 is a control flow diagram of the electronic devices in accordance with the fourth embodiment, in which the part (a) is a control flow diagram of the electronic device A, and the part (b) is a control flow diagram of the electronic device B;

FIG. 15 is a schematic of the control signal in accordance with the fourth embodiment;
FIG. 25 is a control flow diagram of the electronic device in accordance with the seventh embodiment;
FIG. 26 is a schematic of the control signal in accordance with the seventh embodiment;
FIG. 32 is a schematic of the control signal in accordance with the eighth embodiment;
FIG. 33 is a schematic diagram of the place of installation of the electrode of the electronic device B in accordance with the eighth embodiment;
FIG. 34 is a block diagram of the electronic devices in accordance with a ninth embodiment;
FIG. 35 is a control flow diagram of the electronic device in accordance with the ninth embodiment;
FIG. 36 is a schematic of the control signal in accordance with the ninth embodiment;
FIG. 37 is a block diagram of the electronic devices in accordance with the ninth embodiment.

Figure 4:
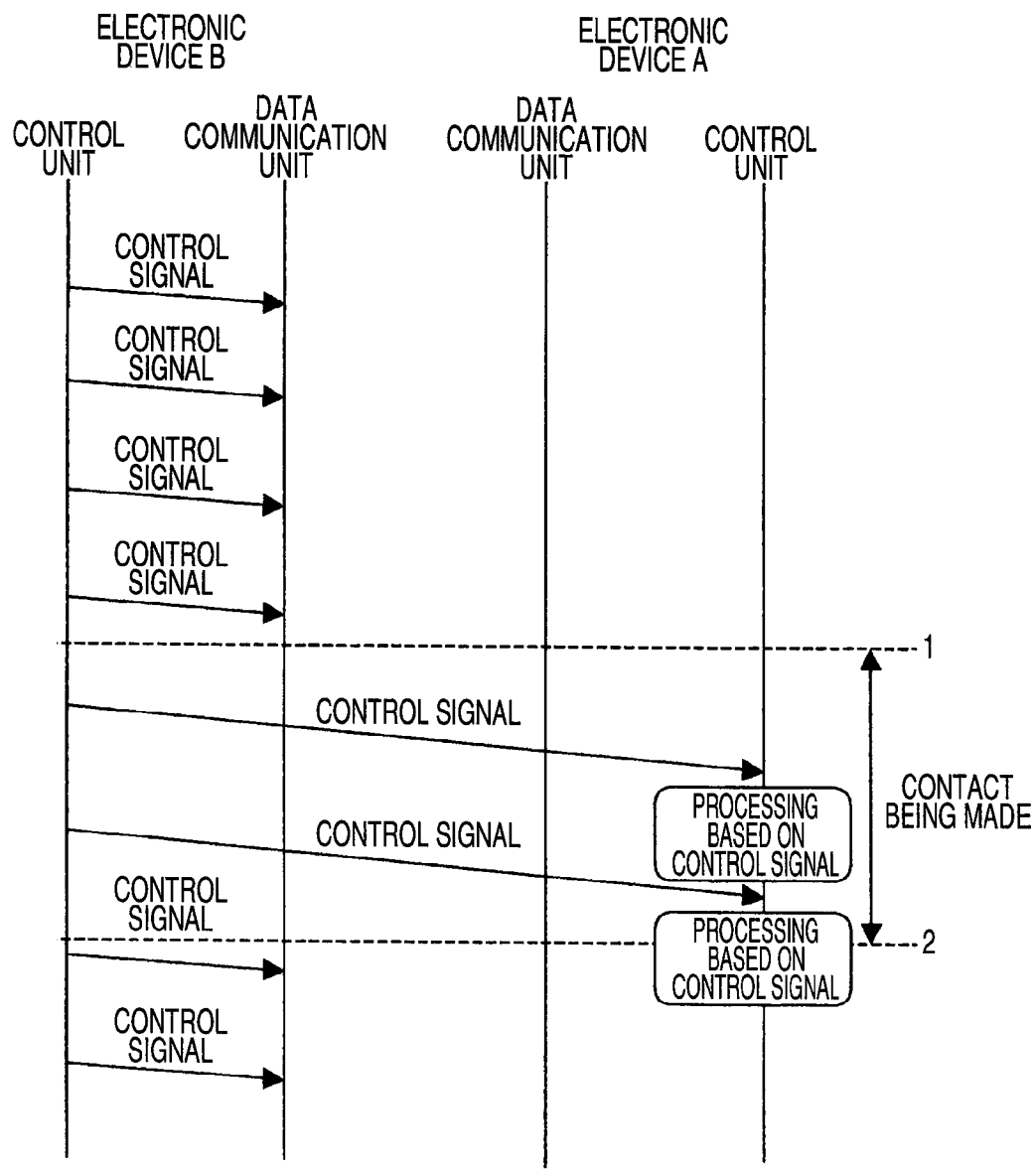
FIG. 4 is a sequence diagram of the electronic devices in accordance with the first embodiment.

DESCRIPTION OF REFERENCE NUMERALS AND SIGNS 1a, 1b: electrodes for human body communication
3a, 3b: data communication unit
5a, 5b: control units
7: recording unit
9: operating unit
11: speed detecting unit
13: generator
15: tire
17: wireless communication unit
19: antenna 23: audio processing unit
25: speaker
27: actuator
29: LED
31: storage unit

BEST MODE FOR CARRYING OUT THE INVENTION

Hereafter, a description will be given of the embodiments of the invention with reference to FIGS. 1 to 38.
(First Embodiment)

FIG. 1 is a block diagram of electronic devices with a human body communication function in accordance with a first embodiment of the invention. As shown in the drawings, an electronic device A (first electronic device) and an electronic device B (second electronic device) are respectively comprised of electrodes for human body communication 1a and 1b including a transceiver electrode and a reference electrode; data communication units 3a and 3b having a data transmitting/receiving function; and control units 5a and 5b for controlling the data communication unit 3. The electrodes for human body communication 1a and 1b and the data communication units 3a and 3b are configured to have lead wires for electrically connecting them.

In the electronic device A, the transceiver electrode and the reference electrode of the electrode for human body communication 1a are formed of an electrically conductive material, and are so arranged that when a user holds the electronic device, the user's fingers come into contact with the transceiver electrode and the reference electrode. Alternatively, if these electrodes are formed inside a casing of the electronic device A, when the user holds the electronic device A, the user's fingers, on the one hand, and the transceiver electrode and the reference electrode, on the other hand, are electromagnetically coupled with each other, thereby maintaining the contact with the human body and making it possible to perform human body communication. In addition, similar coupling is accomplished between the user and the electronic device B, with the result that the electronic device A and the electronic device B are electromagnetically connected through the human body. It should be noted that the "electromagnetic coupling" referred to in this specification includes not only a coupled state (electrical coupling) based on the contact between the conductors but also a coupled state (electrostatic coupling) based on the electric capacity between two objects.

Each of the data communication units 3a and 3b has, for example, an oscillating portion for generating an ac signal; a modem portion for effecting the amplitude modulation and demodulation of data which is transmitted and received by the ac signal; a voltage applying portion for applying a modulation signal across the transceiver electrode and the reference electrode to transmit the data; a voltage detecting portion for detecting the voltage across the transceiver electrode and the reference electrode to receive the data; and a transmission/reception changeover portion for effecting a changeover operation between a transmission mode and a reception mode.

FIG. 2(a) is a control flow diagram of the control unit 5a of the electronic device A, and FIG. 2(b) is a control flow diagram of the control unit 5b of the electronic device B.

Upon receiving a control signal outputted from the electronic device B (Step S11), the control unit 5a of the electronic device A effects control based on that control signal (Step S12). In a case where a control signal is received even after the completion of the control, that control is continued.

The electronic device B constantly outputs a control signal. Meanwhile, the electronic device B resets its timer (Step S21) and starts the counting of the timer (Step S22). When the counter becomes 0 (Step S23: Yes), the electronic device B outputs a control signal to the electronic device A (Step S24).

The control signal which is outputted by the electronic device B is of a predetermined single format, and the electronic device A upon receiving that signal is able to perform predetermined single control.

Alternatively, as shown in FIG. 3(a), the control signal is a command for the control unit 5a of the electronic device A, and the electronic device A may be arranged to effect various kinds of control based on commands. Further, as shown in FIG. 3(b), the control signal may include arbitrary data.

For example, in a case where a code by type of electronic device which specifies an electronic device subject to control is included in the received signal, the control unit 5a of the electronic device A may determine whether or not the device is a subject device, and if it is not, the control unit 5a of the electronic device A may not provide control. In addition, if data which specifies a priority level of execution is included in the control signal, the control unit 5a of the electronic device A may determine which of the control being currently executed and the control based on the control signal is to be executed preferentially. Still alternatively, in a case where the electronic device A has a display device such as a liquid crystal screen and a sound reproduction device such as a speaker, then image data, moving picture data, audio data, and the like may be included in the control signal, and such data may be displayed on the display device of the electronic device A or outputted from the speaker FIG. 4 is a sequence diagram at a time when the electronic device A receives the control signal and performs control. At a point of time above the dotted line 1, the electronic device B continues to output a control signal at a certain fixed cycle which is more than the time for at least carrying out control based on the control signal of the electronic device B. At this point of time, however, the route of human body communication through the possessor of the electronic device A has not been established between the electronic devices A and B, and the electronic device A has not received the control signal. Two situations are conceivable for this.

(1) One is the situation in which although the user of the electronic device A is wearing or holding the electronic device A, the user is remote from the place of installation of the electrode of the electronic device B.

Here, at the point of time of the dotted line 1 the user reaches the place of installation of the electrode of the electronic device B unawares, a human body communication route through the user is formed, and the control unit of the electronic device A receives the control signal. The control unit carries out control on the basis of the control signal.

At the point of time of the dotted line 2, as the user moves the electronic device A away from his or her body by putting it in a bag or the like, or moves away from the place of installation of the electrode of the electronic device B, the control signal to the electronic device A is interrupted. The control which is being executed at this time is executed to the end. However, since the control signal is interrupted, any subsequent control is not executed.

(2) The other is the situation in which although the user has reached the place of installation of the electrode of the electronic device B unawares, the user is not wearing or holding the electronic device A.

In this case, at the point of time of the dotted line 1, the user in the state of being located at the place of installation of the electrode of the electronic device B wears or holds the electronic device A. The subsequent processing is the same as described above.

It goes without saying that if the possessor in the state of not wearing or holding the electronic device A moves away from the place of installation of the electrode of the electronic device B, the electronic device A does not receive the control signal, and no control based on it is executed.

The electronic device B continues to output the control signal at a certain fixed cycle, as described above. Namely, since the electronic device B outputs the control signal at predetermined intervals irrespective of the position of the presence of the electronic device A, even if the possessor of the electronic device A is unintentional, the electronic device A receives the control signal as in the case where the electronic device A has unexpectedly approached the electronic device B. In addition, the fixed cycle need not always be fixed, and may be varied arbitrarily according to a time zone or the like. Further, it is possible to adopt an arrangement in which a sensor for detecting such as a person or other object is provided separately to allow the electronic device B to transmit a control signal when the sensor has detected a person or an object. Accordingly, the "predetermined interval" in the invention includes cases where the interval is varied freely, but is such an interval that the electronic device A is capable of receiving the control signal in a state in which the person is unintentional.

In addition, although the one shown in FIG. 3 is cited as an example of the control signal, the control signal in accordance with the invention is not limited to those describing the substantial function, mode, status, and the like of the electronic device A, but also includes such as a trigger for merely activating a predetermined function of the electronic device A. The mode of substantial operation of the electronic device A such as the one shown in FIG. 3 is not described in such a control signal, and a predetermined function corresponding to the control signal is activated inside the electronic device A.

According to the electronic device in accordance with the above-described first embodiment of the invention, when the user who possesses the electronic device A is electromagnetically coupled to the electronic device A by such as holding the electronic device A in his or her hand, the electronic device receives a signal from the outside without the user in possession of it being intentional, and is thereby capable of executing a function useful or necessary for the possessor under that situation, or of receiving information or a service. Further, there is an advantage in that in a case where the user does not have the electronic device in hand, a signal is not received without providing a special setting.

(Second Embodiment)

Figure 5:
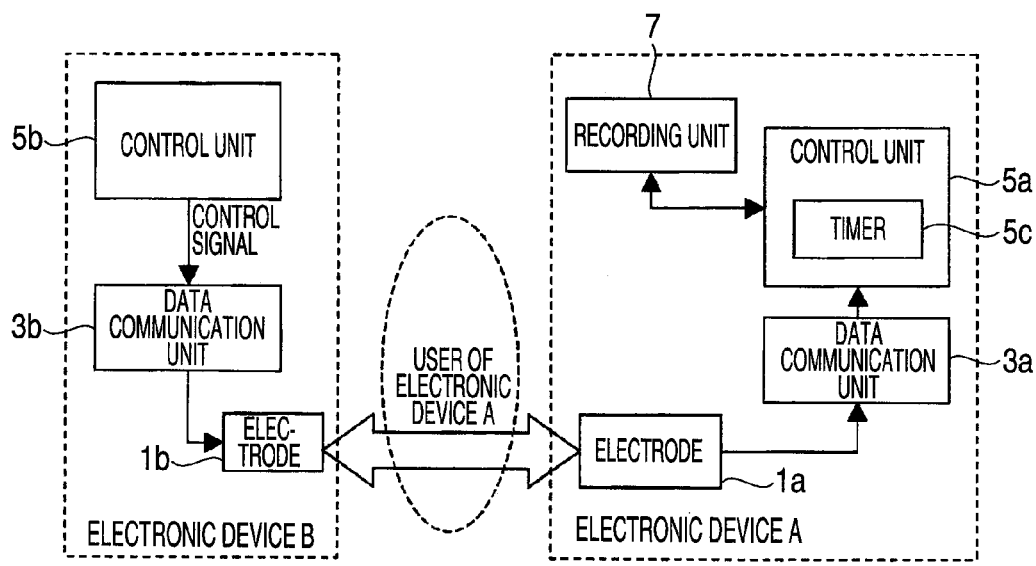
FIG. 5 is a block diagram of the electronic devices in accordance with a second embodiment.

FIG. 5 is a block diagram of the electronic devices with a human body communication function in accordance with a second embodiment of the invention. The electronic device A is comprised of the data communication unit 3*a*; the electrode for human body communication 1*a*; a recording unit 7; a timer 5*c*; and the control unit 5*a*. The electronic device B is comprised of the data communication unit 3*b*; the electrode for human body communication 1*b*; and the control unit 5*b*. The control unit 5*b* outputs to the data communication unit 3*b* a control signal for controlling the electronic device. The data communication unit 3*b* modulates the control signal for performing human body communication, and outputs it to the electrode for human body communication 1*b*.

Figure 6:
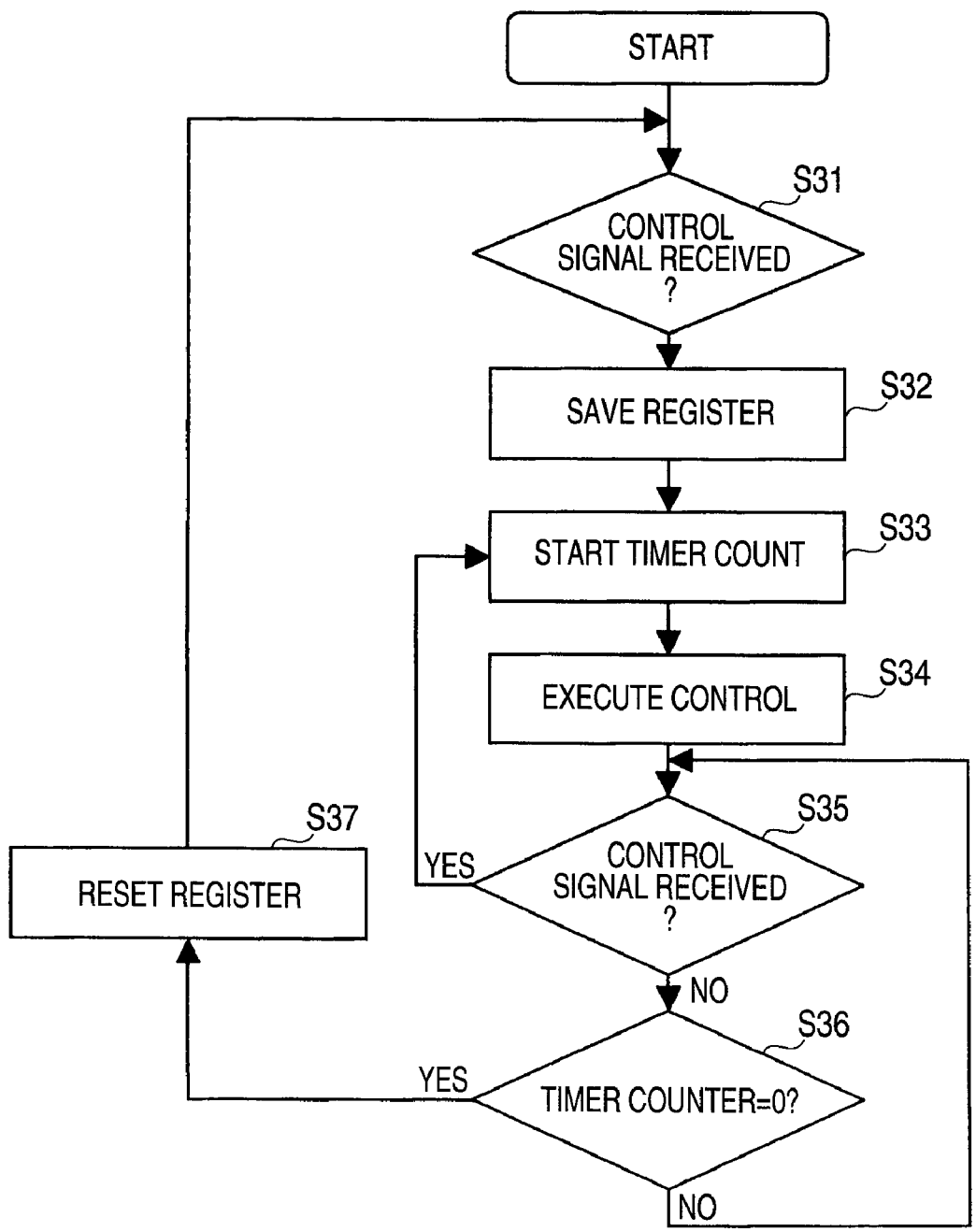
FIG. 6 is a sequence diagram of the electronic device in accordance with the second embodiment.

FIG. 6 shows the control flow of the electronic device A. Here, the control signal which is outputted by the electronic device B is of a single format, and the electronic device A upon receiving that signal is able to perform predetermined control. It goes without saying that the control signal may be designed to include a command and various data to allow the electronic device A to carry out various kinds of control.

Upon receiving the control signal from the electronic device B (Step S31), the control unit 5*a* of the electronic device A temporarily interrupts the processing being carried out, and saves the information of a system register in the recording unit (Step S32). Further, the control unit 5*a* of the electronic device A starts the counting of the timer set to a certain predetermined period (Step S33). The period of the timer is one which is sufficiently longer than the output period of the control signal of the electronic device B.

After starting the counting of the timer, the control unit 5*a* carries out control based on the control signal (Step S34). For example, if the control is one in which a speaker (not shown) is sounded, the sound is continued until the counting of the timer is completed. If an ensuing control signal is received before the completion of the counting of the timer (Step S35: Yes), the timer is reset, and the counting is resumed. If the counting of the timer is completed (Step S36: Yes), the control unit 5*a* resets the saved value of the system register (Step S37) to resume the processing which had been carried out until then.

Thus, according to this embodiment, when the control signal is received, control is carried out on the basis of that control signal, and if the control signal is interrupted, that control is stopped, and it is possible to resume the processing which had been carried out before the reception of the control signal.

(Third Embodiment)

Figure 7:
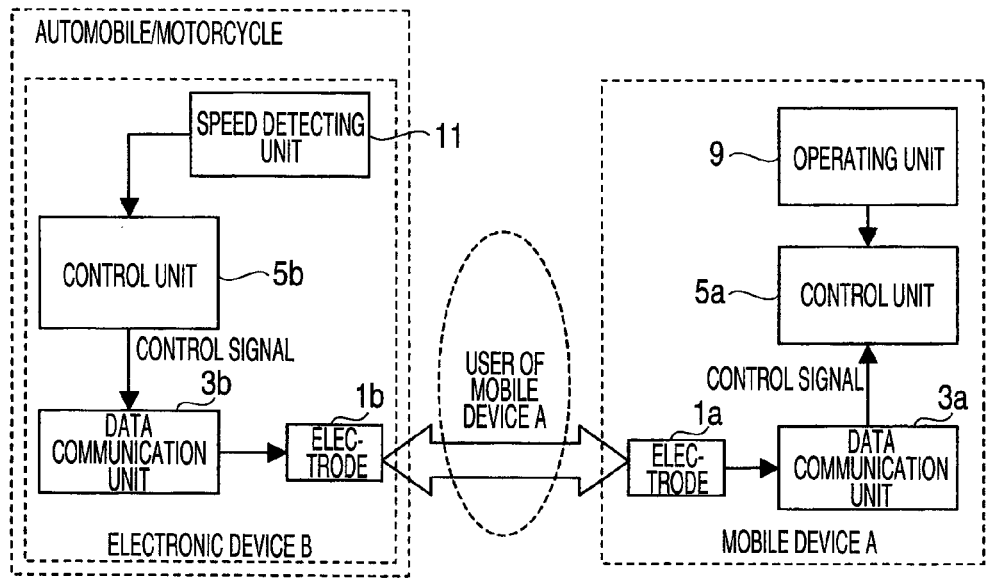
FIG. 7 is a block diagram of the electronic devices in accordance with a third embodiment.

FIG. 7 is a block diagram of the electronic devices with a human body communication function in accordance with a third embodiment of the invention. As shown in this drawing, the electronic device A is a mobile electronic device having the data communication unit 3*a*; the electrode for human body communication 1*a*; an operating unit 9; and the control unit 5*a*. Meanwhile, the electronic device B has the data communication unit 3*b*; the electrode for human body communication 1*b*; a speed detecting unit 11; and the control unit 5*b*, and is installed inside a moving body, such as an automobile or a motorcycle, which has a motor and is movable by being driven by a person. The speed detecting unit 11 has the function of transmitting the speed information of the automobile or the motorcycle to the control unit 5*b*.

Figure 8:
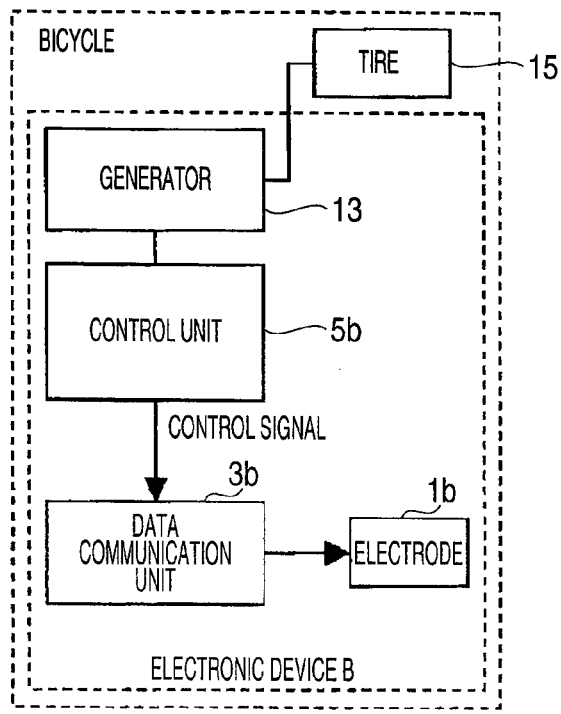
FIG. 8 is a block diagram of the electronic device in accordance with the third embodiment.
Figure 11:
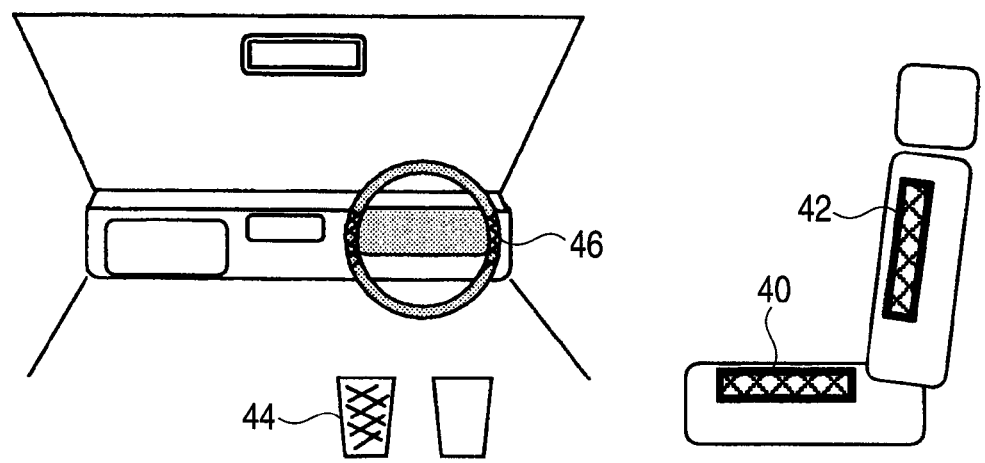
FIG. 11 is a schematic diagram of the place of installation of an electrode of the electronic device B in accordance with the third embodiment.
Figure 11:
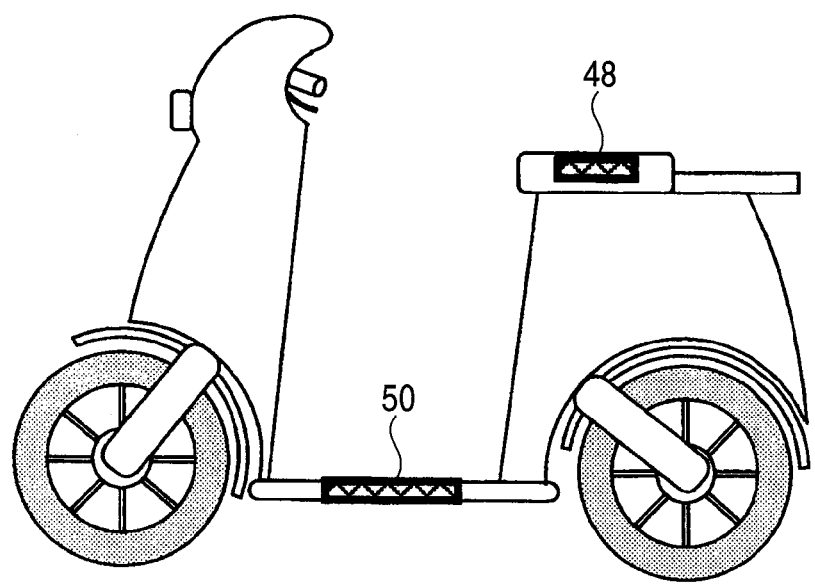

In addition, the electronic device B can also be mounted on a bicycle, as shown in FIG. 8. In that case, the electronic device B does not have the speed detecting unit 11, but is provided with a generator 13 for converting the rotational energy of a wheel generated by a tire 15 into electric energy, so as to supply electric power to the control unit 5*b*.

FIG. 9(*a*) shows the control flow of the electronic device A. Here, it is assumed that the control signal received by the electronic device A is configured by subject device information and a command (FIG. 10). In the control signal, data designating a mobile phone, a PDA, and a mobile game device is shown as the subject device information. Apart from this, a configuration such as the one shown in the first embodiment may be adopted.

Upon receiving the control signal (Step S41), the control unit 5*a* of the electronic device A first makes a comparison to determine whether or not the own device is a subject device (Step S42). If it is determined as a result of the comparison that the own device is a subject device, a key interrupt is inhibited on the basis of the control signal (Step S43). As a result, key entry by the user is disabled. The control unit of the electronic device A continues the inhibition of the key interrupt while the control signal is being received (Step S44: Yes).

Once the control signal is interrupted, the control unit of the electronic device A allows the key interrupt which was being inhibited (Step S45), and the mobile electronic device allows key entry.

FIG. 9(b) shows the control flow of the electronic device B. On the basis of the speed information transmitted from the speed detecting unit 11, the control unit 5b of the electronic device B determines whether the automobile is being driven or at a standstill. If it is determined that the automobile is being driven (Step S51: No), the control unit 5b of the electronic device B outputs a control signal (Step S52). On the other hand, if it is determined that the automobile is at a standstill (Step S51: Yes), the control signal is not outputted.

A description will be given of an example of practical use of such an electronic device. Here, the mobile device A is assumed to be a mobile phone as one example. In addition, the electronic device B is installed in an automobile. The electrode of the electronic device B in terms of its place of installation is installed at any one of the shaded portions in FIG. 11(a), i.e., a seating portion 40, a backrest portion 42, and a brake pedal 44, a steering wheel 46, and a driver's seat belt (not shown) on the automobile driver's seat side. The purpose of the installation at such a portion is to transmit the control signal from any one of these portions to the electronic device A through the driver.

In a case where the electronic device B is installed in a motorcycle, for the same reason, the electrode of the electronic device B is preferably installed at a seat 48, a footrest 50, or the like as shown at the shaded portions in FIG. 11(b).

The user (driver) of the electronic device A gets into the automobile and starts driving. Then, the control unit of the electronic device B starts to output a control signal. Here, when the user holds the electronic device A in his or her hand during driving to operate it, the mobile device A receives the control signal through the user (the state in FIG. 12(1)). When the control signal is received, the key entry of the mobile device A is disabled, so that the user is unable to operate the mobile device A.

Figure 12:
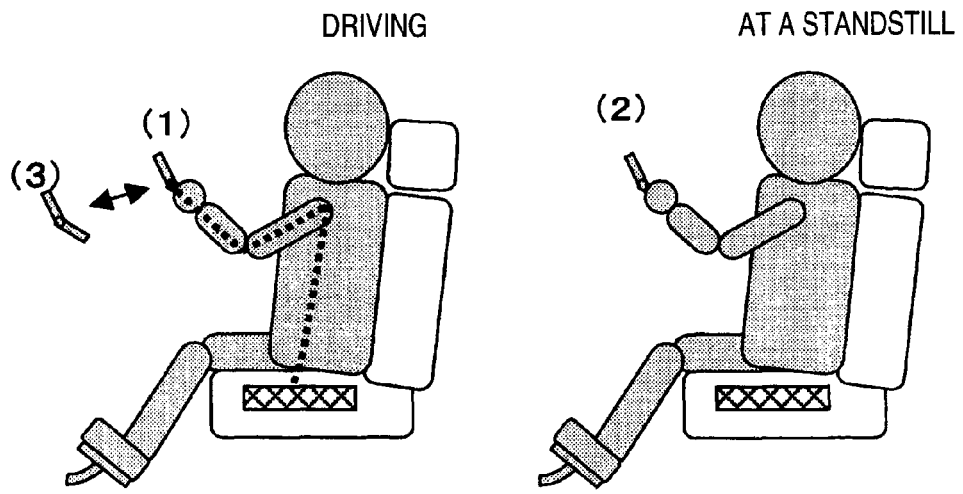
FIG. 12 is an example of use of the electronic devices in accordance with the third embodiment.

When the user stops the vehicle in this state, the control signal from the electronic device B is stopped, and the mobile device A allows the key entry (the state shown in FIG. 12(2)). Alternatively, if the user lets go of the mobile device A, the electronic device B continues to output the control signal, but the control signal is not transmitted to the mobile device A, so that the mobile device A again returns to the state in which the key entry is enabled. It goes without saying that no restriction is imposed on the operation of the mobile device A by a passenger other than the driver even during driving.

Thus, according to this embodiment, it is possible to prevent driver inattention as the driver operates the electronic device such as a mobile phone during driving, and the driver need not provide a special setting in that electronic device for carrying out such control after the starting or finishing of driving. It is possible to provide a mobile electronic device in which key operation is disabled only during driving irrespective of the driver's intention. Further, as for the use of that mobile electronic device by another passenger, usual use is possible even during driving.

(Fourth Embodiment)

Figure 13:
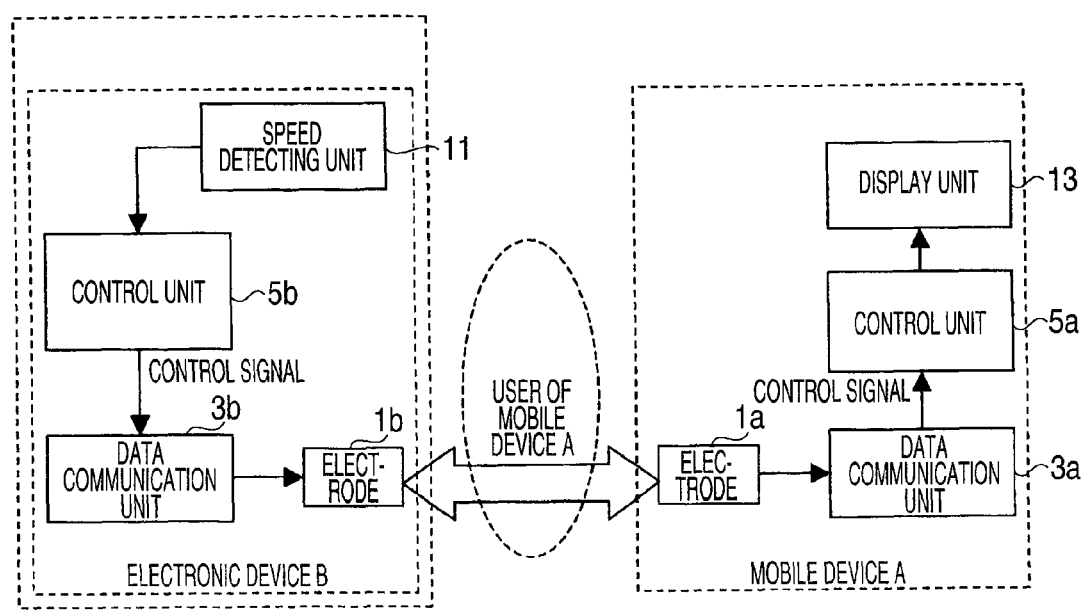
FIG. 13 is a block diagram of the electronic devices in accordance with a fourth embodiment.

FIG. 13 is a block diagram of the electronic devices with a human body communication function in accordance with a fourth embodiment of the invention. In the same way as in the second embodiment, the electronic device A is a mobile electronic device having the data communication unit 3a; the electrode for human body communication 1a; a display unit 13 for displaying characters and images; and the control unit 5a. The electronic device B has the data communication unit 3b; the electrode for human body communication 1b; the speed detecting unit 11; and the control unit 5b, and is installed inside an automobile or a motorcycle. The speed detecting unit 11 has the function of transmitting the speed information of the automobile or the motorcycle to the control unit 5b. The places of installation of the electrode of the electronic device B are similar to those of the third embodiment.

FIG. 14(a) shows the control flow of the electronic device A. Here, it is assumed that the control signal received by the electronic device A is configured by subject device information and a command (FIG. 15). In the control signal, data designating a mobile phone, a PDA, and a mobile game device is shown as the subject device information. Apart from this, a configuration such as the one shown in the first embodiment may, of course, be adopted.

Upon receiving the control signal (Step S61), the control unit 5a of the electronic device A first makes a comparison to determine whether or not the own device is a subject device (Step S62). If it is determined as a result of the comparison that the own device is a subject device (Step S62: Yes), the control unit 5a stops the output of display data to the display unit 13 on the basis of the control signal (Step S63). Alternatively, processing for reading the data to be displayed from memory may be stopped. By so doing, nothing is displayed on the display unit 13. Processes other than the process concerning the screen display are continued to be executed even after the reception of the control signal.

While the control signal is being received (Step S64: Yes), the control unit 5a of the electronic device A continues the processing in which the screen display is not carried out (Step S63). Once the control signal is interrupted, the control unit 5a of the electronic device A enables the screen display which was being inhibited (Step S64: No).

FIG. 14(b) shows the control flow of the electronic device B. On the basis of the speed information transmitted from the speed detecting unit 11, the control unit 5b of the electronic device B determines whether the automobile is being driven or at a standstill. If it is determined that the automobile is being driven (Step S71: No), the control unit 5b of the electronic device B outputs a control signal (Step S72). On the other hand, if it is determined that the automobile is at a standstill (Step S71: Yes), the control signal is not outputted.

The advantages derived from the practical use of such an electronic device are similar to those of the third embodiment. In other words, it is possible to prevent driver inattention as the driver gazes at the screen of the electronic device such as a mobile phone during driving, and the driver need not provide a special setting in that electronic device for carrying out such control after the starting or finishing of driving. In addition, it is possible to provide a mobile electronic device in which the screen display is disabled only during driving irrespective of the driver's intention. As for the use of that mobile electronic device by another passenger, usual use is possible even during driving.

(Fifth Embodiment)

Figure 16:
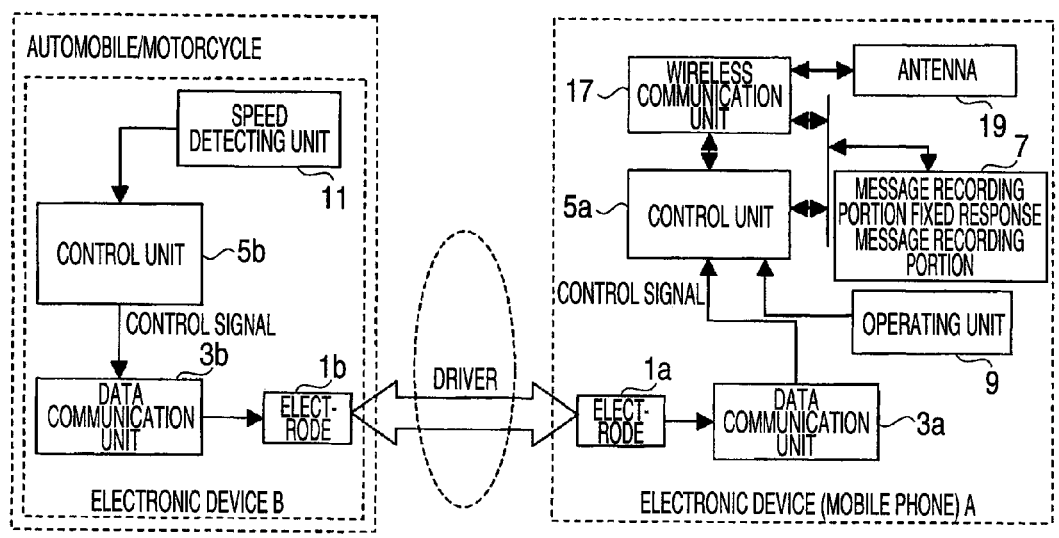
FIG. 16 is a block diagram of the electronic devices in accordance with a fifth embodiment.

FIG. 16 is a block diagram of the electronic devices with a human body communication function in accordance with a fifth embodiment of the invention. The electronic device A is a mobile phone having the data communication unit 3a and the electrode for human body communication 1a. Meanwhile, the electronic device B has the data communication unit 3b; the electrode for human body communication 1b; the speed detecting unit 11; and the control unit 5b, and is installed inside an automobile or a motorcycle. The places of installation of the electrode of the electronic device B are similar to those of the third and fourth embodiments.

The mobile phone has a wireless communication unit 17 for performing wireless communication; the recording unit 7 including a message recording portion for storing voice messages received and a fixed response message recording portion for storing a predetermined fixed response message; the display unit (not shown); and the operating unit 9. The wireless communication unit 17 has a wireless transceiver portion and a modem portion for effecting the demodulation of the signal received by the transceiver portion and the modulation of the signal transmitted from the wireless transceiver portion.

The electronic device B is provided with the speed detecting unit 11. The speed detecting unit 11 has the function of transmitting the speed information of the automobile or the motorcycle to the control unit.

Figure 17:
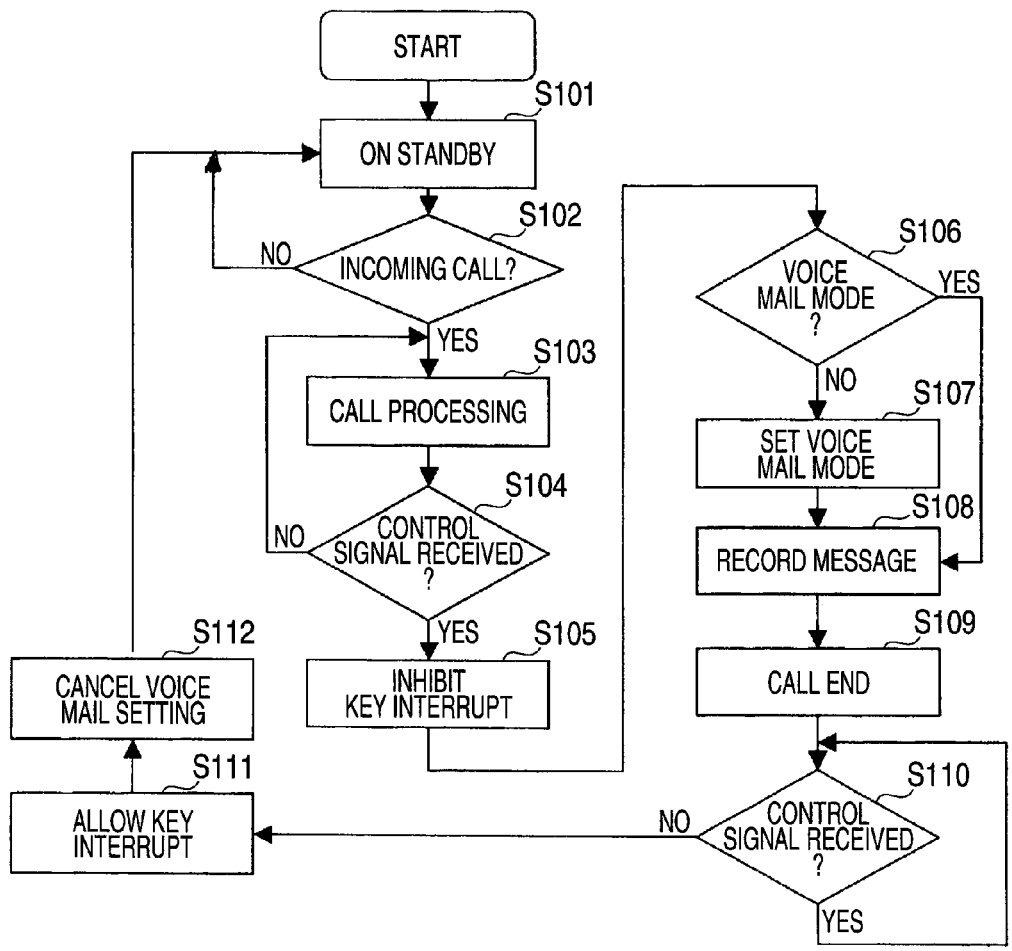
FIG. 17 is a control flow diagram of the electronic devices in accordance with the fifth embodiment, in which the part (a) is a control flow diagram of the electronic device A, and the part (b) is a control flow diagram of the electronic device B.
Figure 17:
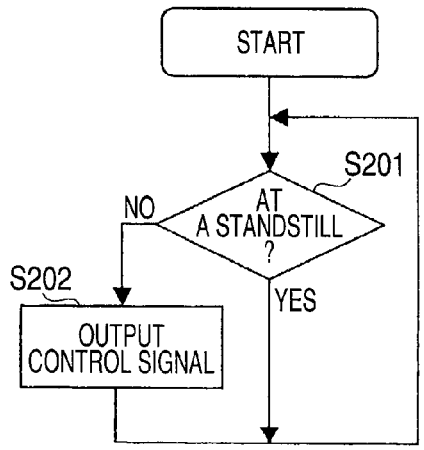
Figures 18, 19:
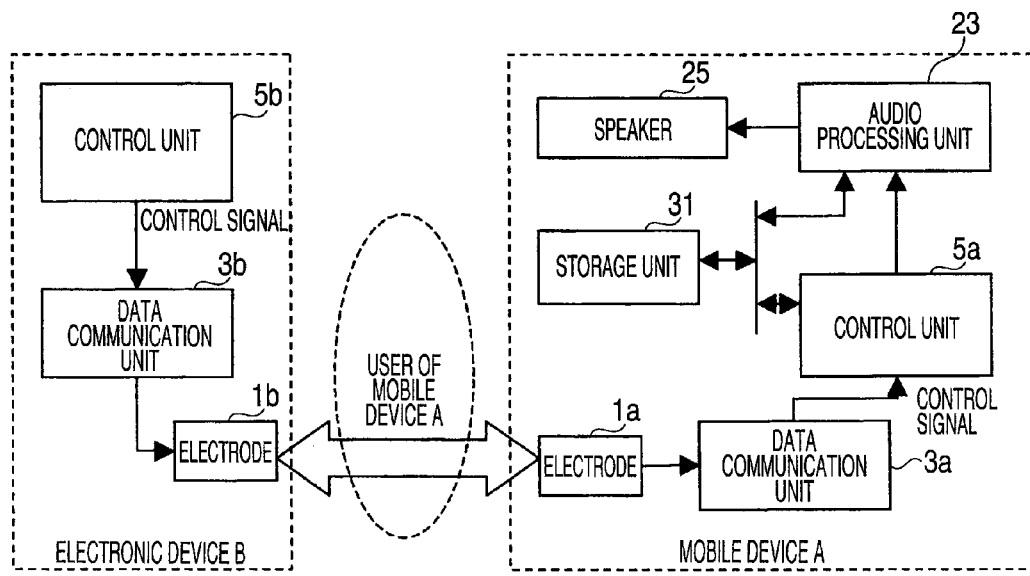
FIG. 18 is a schematic of the control signal in accordance with the fifth embodiment.
FIG. 19 is a block diagram of the electronic devices in accordance with a sixth embodiment.

FIG. 17(*a*) shows the control flow of the mobile phone A. Here, it is assumed that the control signal received by the mobile phone A is configured by subject device information and a command (FIG. 18). In the control signal, data designating a mobile phone is shown as the subject device information. Apart from this, a configuration such as the one shown in the first embodiment may, of course, be adopted.

In a case where the mobile phone has received a voice call on the basis of the signal from the wireless communication unit 17 (Step S102: Yes), the control unit 5*a* of the mobile phone carries out incoming call processing, and notifies the user of the incoming call by such as playing a ringtone or vibrating a vibrator (Step S103).

Upon receiving the control signal during the incoming call processing (Step S104), the control unit 5*a* of the mobile phone A first makes a comparison to determine whether or not the own device is a subject device. If it is determined as a result of the comparison that the own device is a subject device (Step S104: Yes), a key interrupt is inhibited (Step S105). Subsequently, if the own device has not been set in a voice mail mode, the own device is automatically set to the voice mail mode (Step S106: Yes), a fixed response message is transmitted to the other party, and a voice message from the other party is stored in the message recording portion (Step S108).

If the mobile phone A receives a control signal even after the line was disconnected (Step S110: Yes), disenabling of key entry and voice mail setting are continued. On the other hand, if the control signal is not received after the line was disconnected (Step S110: No), the key entry is allowed (Step S11), and the voice mail setting is cleared (Step S112).

FIG. 17(*b*) shows the control flow of the electronic device B. On the basis of the speed information transmitted from the speed detecting unit 11, the control unit of the electronic device B determines whether the automobile is being driven or at a standstill. If it is determined that the automobile is being driven (Step S201: No), the control unit of the electronic device B outputs a control signal (Step S202). On the other hand, if it is determined that the automobile is at a standstill (Step S201: Yes), the control signal is not outputted.

A description will be given of an example of practical use of such a mobile phone. The places of installation of the electrode of the electronic device B are as described in the second embodiment with reference to FIGS. 11(*a*) and 11(*b*).

First, the user (driver) of the mobile phone A gets into the automobile and starts driving. The control unit of the electronic device B starts to output a control signal. In a case where the mobile phone A has received a voice call during driving, the mobile phone rings to notify the user of the incoming call. Here, when the user holds the mobile phone A in his or her hand during driving to answer the phone call, the mobile device A receives the control signal through the user.

Upon receiving the control signal, the mobile phone A first disables key entry to prevent answering the phone call, and is then automatically set to the voice mail mode.

When the mobile phone is set in the voice mail mode, a voice message from the caller is recorded, and the state of setting should desirably be retained until the termination of the call even if the control signal is interrupted by such as stopping the automobile or as the user lets go of the mobile device A. After the disconnection of the line, if the received signal is not being received, the mobile phone A allows key entry and is changed over from the voice mail mode to a usual standby mode. However, the recorded message is stored in the mobile phone A, and must be made to be heard later. As for the deactivation of the voice mail recording, deactivation may be effected manually once the setting is provided on the basis of the control signal.

It goes without saying that no restriction is imposed on answering the call on the mobile phone A of an incoming call by a passenger other than the driver even during driving.

Thus, according to this embodiment, it is possible to provide a mobile phone which is automatically set to the voice mail mode so as to prevent driver inattention as the driver answers the phone in a case where the mobile phone has received an incoming call during driving. This provides an automatic setting to the voice mail mode only in the case where the driver responds to an incoming call during driving irrespective of the driver's intention. Usual use is possible when the automobile is at a standstill or another passenger answers the incoming call of the mobile phone even during driving.

(Sixth Embodiment)

FIG. 19 is a block diagram of the electronic devices with a human body communication function in accordance with a sixth embodiment of the invention. The electronic device A is a mobile electronic device having the data communication unit 3*a*; the electrode for human body communication 1*a*; a speaker 25; an audio processing unit 23 for outputting an audio signal to the speaker; and a storage unit 31 for storing the audio signal. Meanwhile, the electronic device B has the data communication unit 3*b*; the electrode for human body communication 1*b*; the speed detecting unit (not shown); and the control unit 5*b*, and is installed in places where the sound from electronic devices causes annoyances to those in the surroundings, such as public vehicles including trains and buses (body of public transport), movie houses, and theaters.

Figure 20:
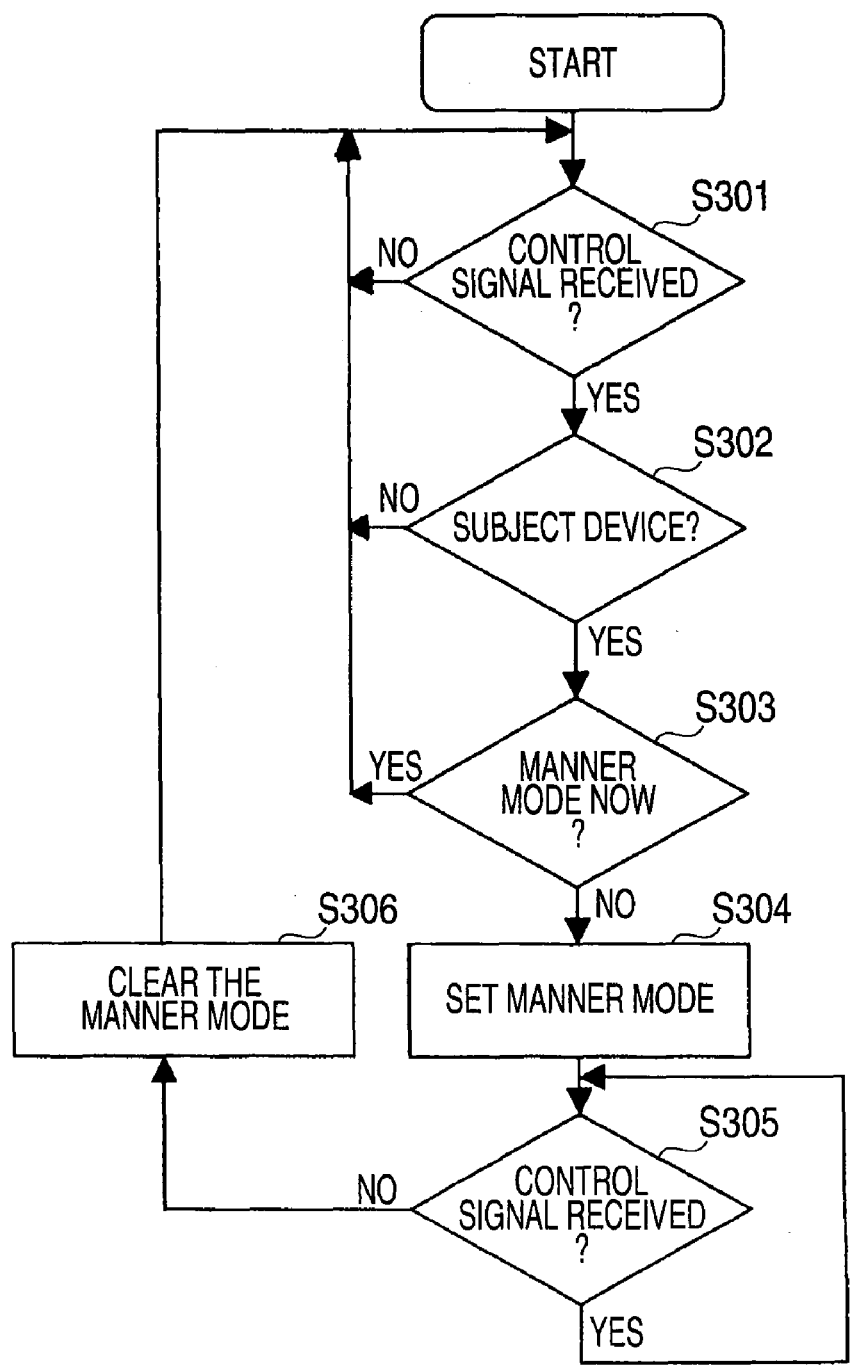
FIG. 20 is a control flow diagram of the electronic device in accordance with the sixth embodiment.
Figures 21, 22:
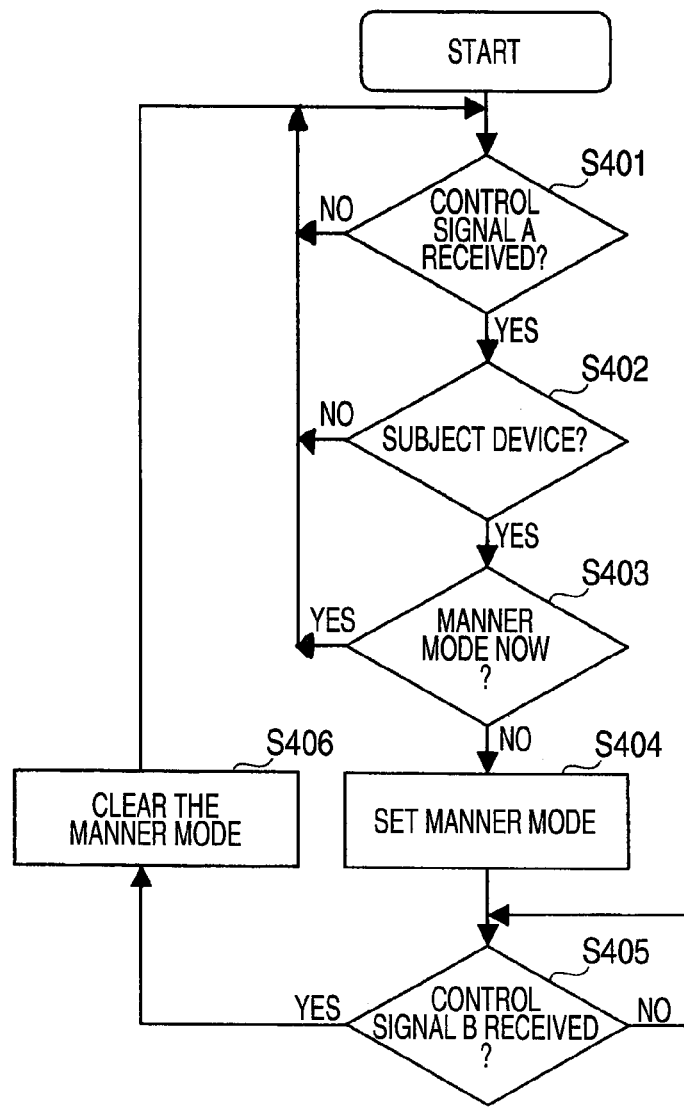
FIG. 21 is a control flow diagram of the electronic device in accordance with the sixth embodiment.
FIG. 22 is a schematic of the control signal in accordance with the sixth embodiment.
Figure 23:
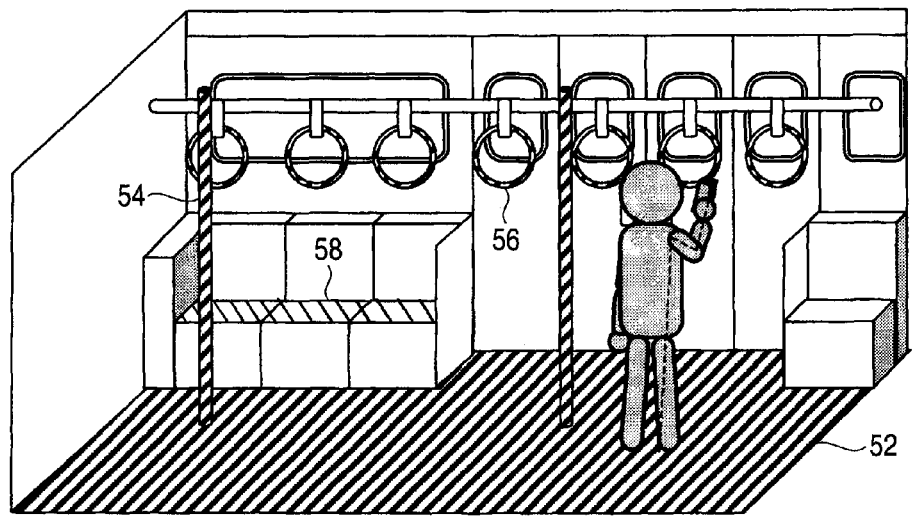
FIG. 23 is a schematic diagram of the place of installation of the electrode of the electronic device B in accordance with the sixth embodiment.

FIG. 20 shows the control flow of the mobile device A. Here, it is assumed that the control signal received by the mobile device A is configured by subject device information and a command (FIG. 22). In the control signal, data designating a mobile phone and a wrist watch with an alarm function is described as the subject device information, and a command inhibiting the audio output to the speaker is described. Alternatively, a mobile phone may be set as the subject device information, and a manner mode may be set as the command. Apart from this, a configuration such as the one shown in the first embodiment may be adopted.

Upon receiving the control signal (Step S301), the control unit of the mobile device A first makes a comparison to determine whether or not the own device is a subject device (Step S302). If it is determined as a result of the comparison that the own device is a subject device (Step S302: Yes), a determination is made as to whether or not the manner mode is presently set (Step S303). If it is determined that the manner mode is presently not set (Step S303: No), the manner mode is set by stopping the output of audio data to the audio processing unit 23 or by setting the gain of a sound source amplifier to 0 on the basis of the control signal (Step S304), thereby stopping the audio output to the speaker. While receiving the control signal (Step S305: Yes), the control unit 5a of the mobile device A continues to inhibit the audio output. Once the control signal is interrupted (Step S305: Yes), the control unit 5a of the mobile device A clears the manner mode, and allows the audio output to the speaker which has been inhibited (Step S306). Also in a case where the subject device is a mobile phone and the command is the setting of the manner mode, the mobile phone effects the setting and clearing of the manner mode on the basis of the control signal in a similar procedure.

The control unit 5b of the electronic device B may constantly output a control signal while power is being supplied to it, or some switch may be provided, and the control signal may be outputted only when the switch is on.

FIG. 21 shows a different control flow of the mobile electronic device A. Here, the flow up to the step in which the manner mode is set to inhibit the audio output is similar to that of the foregoing description, but the setting is retained even if the control signal is interrupted after the inhibition of the audio output (Step S405: No). In this state, if the mobile device A receives a control signal B different from the control signal A which inhibited the audio output (Step S405: Yes), the inhibition of the audio output is cleared (Step S406).

A description will be given of an example of practical use of such a mobile device. Here, it is assumed that the mobile device A is a mobile phone by way of example. In addition, the place where the electronic device B is provided is assumed to be a train. The electrode of the electronic device B in terms of its place of installation is installed at any one of a floor 52 of the train, a handrail 54, a strap 56, and a seat 58, as shown in the shaded portions in FIG. 23. The same applies to buses or other body of public transportation. In movie houses or theaters, the electrode of the electronic device B is installed in a floor or a seat at a place where the audio output from the electronic device is not desirable. Here, the embodiment will be described by citing a train as an example.

When the user is on the train, if the user forgets to set the mobile phone in the manner mode, the sound of the mobile phone is produced due to such as call incoming or an alarm, and undesirably annoys passengers in the surroundings. Here, it would suffice if the user is able to promptly set the mobile phone in the manner mode, but there frequently occur situations in which even after the user came to know that his or her own mobile phone is ringing, the user is unable to stop the ringing of the sound.

According to this embodiment, as the user only touches the mobile phone when the mobile phone is ringing, the mobile phone receives through the user the control signal being outputted from the train, and the mobile phone is automatically set in the mute or manner mode. Even with a mobile phone from which an operating sound is produced, the control signal is naturally inputted to the mobile phone when the mobile phone is in hand, so that the operating sound is not outputted from the speaker.

It may be so designed that after the reception of the control signal is interrupted, the mobile phone is reset to the state prior to being set to the mute or manner mode, or the setting is maintained once the control signal is received. In the latter case, it is necessary to manually reset the mobile phone to its original state after getting off the train. For this reason, it may be expedient to install at a ticket barrier of a station an electrode for outputting a control signal for supporting the reset, and to clear the setting as the user passes there while holing the mobile phone in his or her hand.

Thus, according to this embodiment, it is possible to turn off the sound without the user becoming bewildered or aware in an environment where surrounding people can be annoyed by the sound issued from electronic devices.

(Seventh Embodiment)

Figure 24:
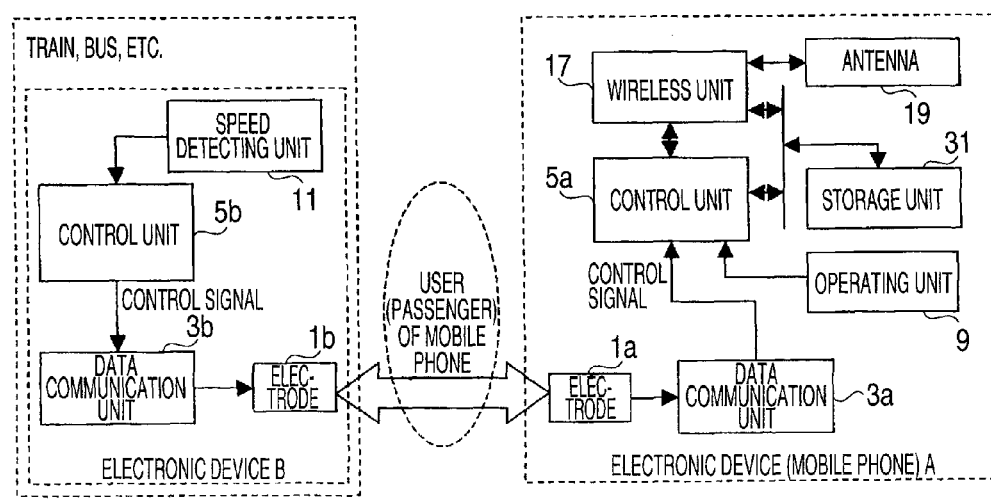
FIG. 24 is a block diagram of the electronic devices in accordance with a seventh embodiment.
Figure 27:
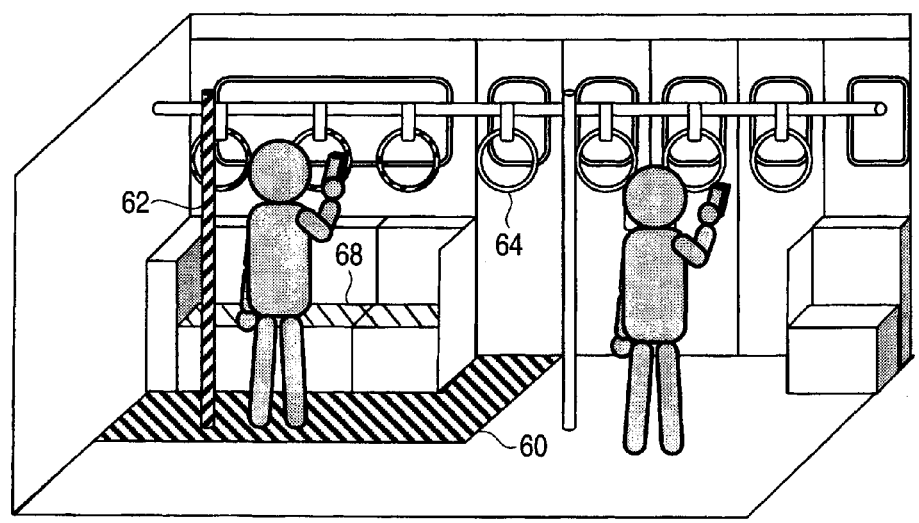
FIG. 27 is a schematic diagram of the place of installation of the electrode of the electronic device B in accordance with the seventh embodiment.

FIG. 24 is a block diagram of the electronic devices with a human body communication function in accordance with a seventh embodiment of the invention. The electronic device A is a mobile phone having the data communication unit 3a and the electrode for human body communication 1a. Meanwhile, the electronic device B has the data communication unit 3b; the electrode for human body communication 1b; the speed detecting unit 11; and the control unit 5b, and is installed in such as trains, buses, and airplanes, i.e., places where the transmission of radio waves need to be stopped because radio waves of the mobile phone exert, or are feared to exert, adverse effects on the human body or equipment.

FIG. 25 shows the control flow of the mobile phone A. Here, it is assumed that the control signal received by the mobile phone A is configured by subject device information and a command (FIG. 26). In the control signal, data designating a mobile phone is described as the subject device information, and a command inhibiting the use of wireless is described. Specifically, methods are conceivable in which the modem portion is deactivated, and in which the oscillation of radio waves is stopped.

Upon receiving the control signal (Step S501), the control unit of the mobile phone A first makes a comparison to determine whether or not the own device is a subject device (Step S502). If it is determined as a result of the comparison that the own device is a subject device (Step S502: Yes)), a display is given on the display unit to the effect that the wireless function is deactivated on the basis of the control signal (Step S503), and radio transmission and reception are stopped (Step S504). The control unit of the mobile phone A, while receiving the control signal, continues to inhibit the radio transmission and reception (Step S505: Yes). Once the control signal is interrupted (Step S505: No), the control unit of the mobile phone A allows the radio transmission and reception which was inhibited (Step S506).

Alternatively, although the flow up to the step in which the radio transmission and reception are inhibited is similar to that of the foregoing description, it may be so designed that after the radio transmission and reception are inhibited, the setting is retained even if the control signal is interrupted. In this state, if the mobile phone A receives a control signal different from the control signal which inhibited the radio transmission and reception, the inhibition of the radio transmission and reception is canceled.

The control unit of the electronic device B may constantly output a control signal while power is being supplied to it, or some switch may be provided, and the control signal may be outputted only when the switch is on.

A description will be given of an example of practical use of such a mobile phone. The place where the electronic device B is provided is assumed to be a train. The electrode of the electronic device B in terms of its place of installation is installed at any one of a floor 60 of the train close to a priority seat, a handrail 62, a strap 64, and a priority seat 68, as shown in the shaded portions in FIG. 27. The same applies to buses or other body of public transportation.

When the user gets on a train and is seated in the priority seat or standing close to it, there is a possibility that the radio waves of the mobile phone cause serious annoyances to passengers in the surroundings. Here, it would suffice if the user is able to promptly stop the radio transmission and reception of the mobile phone, but the circumstances are such that people who themselves cut off the power of their mobile phones or stop the radio transmission and reception are limited.

According to this embodiment, when the user is close to the priority seat, as the user only touches the mobile phone, the mobile phone receives through the user the control signal being outputted from such as the floor close to the priority seat, and the mobile phone is automatically set to stop the radio transmission and reception. When the mobile phone is in hand, the control signal is naturally inputted to the mobile phone, so that the user, while being close to the priority seat, is totally unable to send mail or the like from his or her side.

It may be so designed that after the reception of the control signal is interrupted, the mobile phone is reset to enable the wireless communication, or the setting is maintained once the control signal is received. In the latter case, it is necessary to manually clear the setting if the user moves away from the priority seat. Therefore, it may be expedient to install in a floor other than the one close to the priority seat an electrode for outputting such a control signal, such that if the user wishes to effect transmission or reception, the setting is automatically cleared as the user merely moves away from the priority seat.

Thus, according to this embodiment, it is possible to provide a mobile phone whereby, in places where the radio transmission and reception are prohibited on grounds that adverse effects may possibly be exerted on the surrounding people and electronic equipment by radio waves emitted from the mobile phones, the radio transmission and reception are deactivated without the user becoming aware, and in a case where the user has moved away from that place, the mobile phone can be reset without providing a detailed setting.

(Eighth Embodiment)

Figure 28:
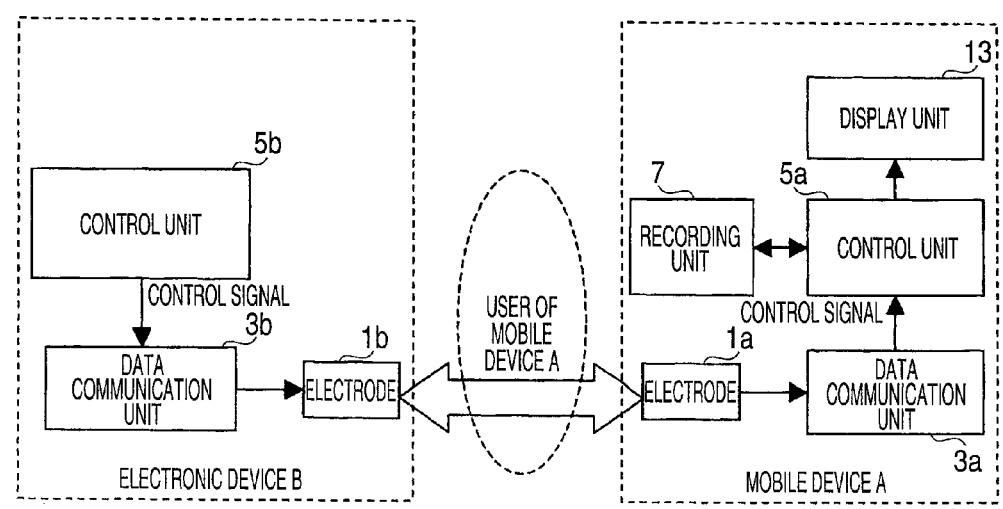
FIG. 28 is a block diagram of the electronic devices in accordance with an eighth embodiment.

FIG. 28 is a block diagram of the electronic devices with a human body communication function in accordance with an eighth embodiment of the invention. The electronic device A is a mobile device having the data communication unit 3a; the recording unit 7 for storing display data; and the display unit 13 for displaying the display data. Meanwhile, the electronic device B has the data communication unit 3b; the electrode for human body communication 1b; and the control unit 5b, and is installed in dangerous places. Here, the dangerous places are those places where when the attentiveness of the user of the electronic device A to the surroundings has decreased due to such as operating the electronic device A while walking, a danger can possibly occur to the user owing to a change in the surrounding environment. Namely, these places include vicinities of stairways, utility poles, crossings, construction sites, and the like. The electronic device B is installed in a road in the vicinity of the dangerous place where the danger can be avoided after the user of the mobile device has become aware of the dangerous place.

Figure 29:
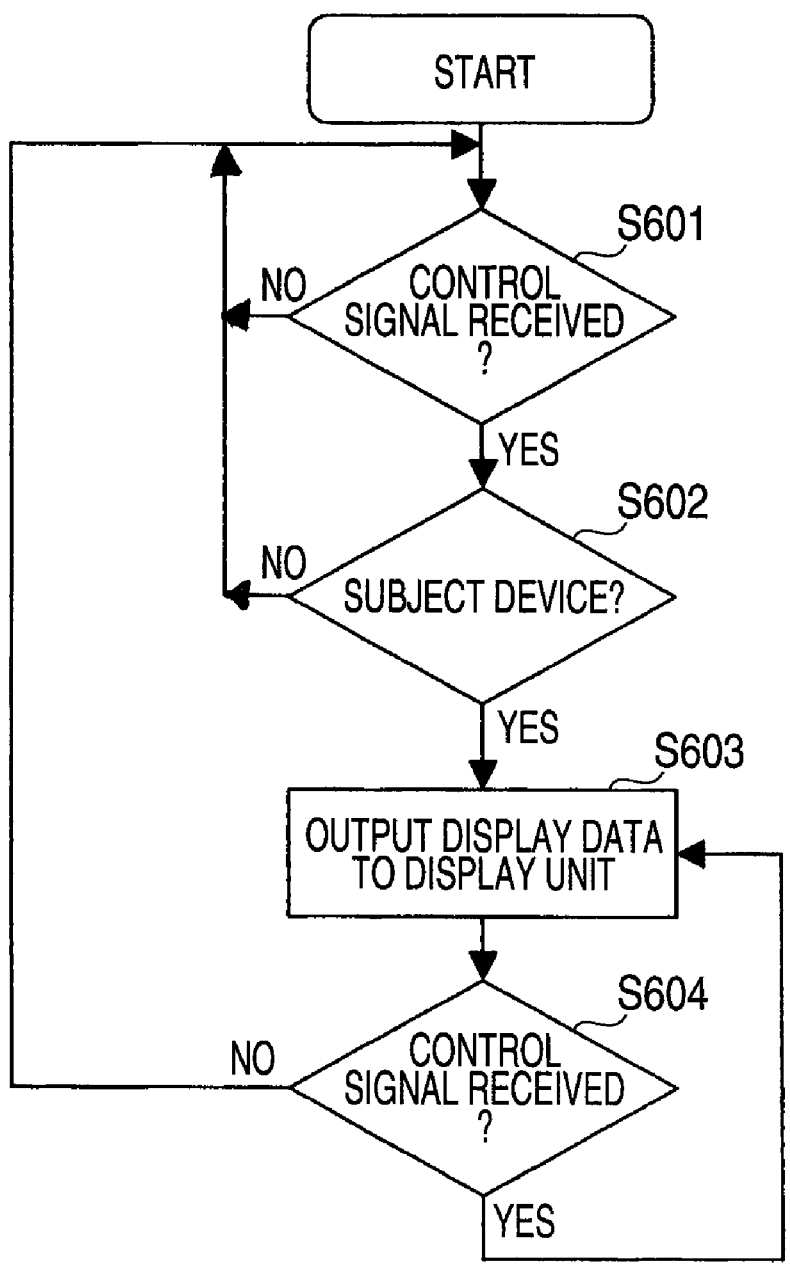
FIG. 29 is a control flow diagram of the electronic device in accordance with the eighth embodiment.
Figures 30, 31:
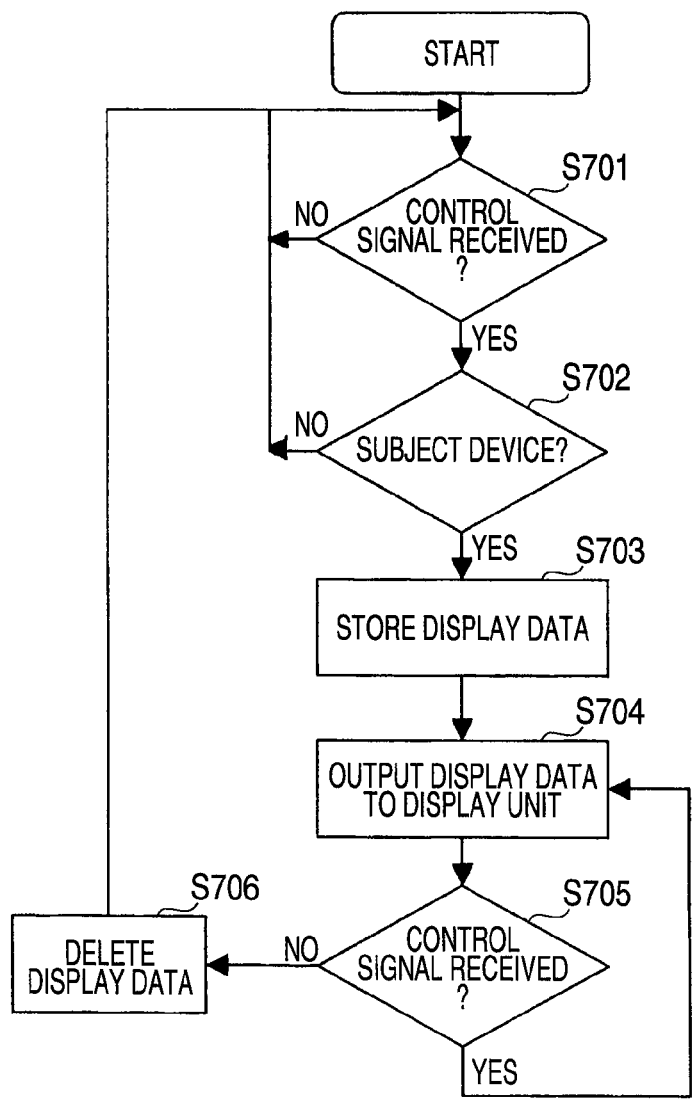
FIG. 30 is a control flow diagram of the electronic device in accordance with the eighth embodiment.
FIG. 31 is a schematic of the control signal in accordance with the eighth embodiment.

FIG. 29 shows the control flow of the mobile device A. A display message is stored in advance in the recording unit 7 of the mobile device A. Here, it is assumed that the control signal received by the mobile device A is configured by subject device information and a command (FIG. 31). In the control signal, data designating a mobile phone, a PDA, and a mobile game device is described as the subject device information, and a command displaying a danger message is described.

Upon receiving the control signal (Step S601), the control unit 5a of the mobile device A first makes a comparison to determine whether or not the own device is a subject device (Step S602). If it is determined as a result of the comparison that the own device is a subject device (Step S602: Yes)), the display message is read from the recording unit on the basis of the control signal. Then, the display message thus read is displayed on the display unit (Step S603). The control unit of the mobile device A, while receiving the control signal, continues to display the display message (Step S604: Yes). Once the control signal is interrupted (Step S604: No), the control unit of the mobile device A terminates the display of the display message.

The control unit of the electronic device B may constantly output a control signal while power is being supplied to it, or some switch may be provided, and the control signal may be outputted only when the switch is on. Alternatively, an arrangement may be provided such that by providing a camera, an infrared sensor, or the like, a control signal is outputted when the sensor has detected that a person has approached its vicinity.

FIG. 30 shows a different control flow of the mobile device A. In the control signal, data designating a mobile phone, a PDA, and a mobile game device is described as the subject device information, and display data and a display command are described (FIG. 32).

Here, the flow up to the step in which a determination is made as to whether or not the own device is a subject device is similar to that of the foregoing description. However, after it is determined that the own device is a subject device, the display data included in the control signal is stored in the recording unit 7 (Step S703). The control unit 5a outputs the stored display data to the display unit (Step S704). The control unit 5 of the mobile device A, while receiving the control signal, continues to display the display data (Step S705: Yes). Alternatively, it may be so designed that the storage and display of the display data are repeatedly continued. By so doing, it is possible to display a message, a moving picture, and the like which cannot be displayed at a time. Once the control signal is interrupted (Step S705: No), the control unit 5a of the mobile device A terminates the display of the display message (Step S706).

A description will be given of an example of practical use of such a mobile device. Here, the mobile device A is assumed to be a mobile phone. The place where the electronic device B is provided is assumed to be a vicinity of a stairway. The electrode of the electronic device B in terms of its place of installation is installed in a floor about 1 m on this side from the stairway. The same applies to vicinities of utility poles and traffic lights, vicinities of construction sites, and the like.

It is assumed that the user is walking while reading an e-mail received by the mobile phone, and has then closely approached a descending stairway. Since the user is gazing at the screen, his or her attentiveness to the surrounding situation has decreased, and the user is not aware of the presence of the stairway nearby. If the user is still reading the e-mail upon closely approaching the stairway, the mobile phone receives through the user the control signal being outputted from the electrode of the electronic device B installed on this side of the stairway, and a display is given on the screen to the effect that there is a danger. Since the user is viewing the screen, he or she becomes aware of it, and is able to avoid the danger beforehand.

Thus, according to this embodiment, it is possible to prevent beforehand the danger which occurs when the user operates the mobile device or gazes at the screen while walking. As a result, it is possible to provide a mobile device which reliably gives a display of the danger only to the person who is operating or viewing the screen, i.e., the person who is holding the mobile device in his or her hand, whereas no display is given to the mobile device of a person who is not doing so even if he or she has closely approached a place requiring caution such as a stairway.

(Ninth Embodiment)

FIG. 34 is a block diagram of the electronic devices with a human body communication function in accordance with a ninth embodiment of the invention. The electronic device A is a mobile device having the data communication unit $3a$; the electrode for human body communication $1a$; an actuator 27 for imparting a tactile sense to the user; and the control unit $5a$. Meanwhile, the electronic device B has the data communication unit $3b$; the electrode for human body communication $1b$; and the control unit $5b$, and is installed in dangerous places. Here, the dangerous places are those places where when the attentiveness of the user of the electronic device A to the surroundings has decreased due to such as operating the electronic device A while walking, a danger can possibly occur to the user owing to a change in the surrounding environment. Namely, these places include vicinities of stairways, utility poles, crossings, construction sites, and the like. The electronic device B is installed in a road in the vicinity of a dangerous place where the danger can be avoided after the user of the mobile device has become aware of the dangerous place.

FIG. 35 shows the control flow of the mobile device A. Here, it is assumed that the control signal received by the mobile device A is configured by subject device information and a command (FIG. 36). In the control signal, data designating a mobile phone and a mobile game device is described as the subject device information, and a command for vibrating the actuator is described.

Upon receiving the control signal (Step S801), the control unit $5a$ of the mobile device A first makes a comparison to determine whether or not the own device is a subject device (Step S802). If it is determined as a result of the comparison that the own device is a subject device (Step S802: Yes)), the actuator 27 is actuated on the basis of the control signal (Step S803). The control unit $5a$ of the mobile device A, while receiving the control signal, continues the operation of the actuator 27 (Step S804: Yes). Once the control signal is interrupted (Step S804: No), the control unit 5 of the mobile device A terminates the operation of the actuator 27.

The control unit of the electronic device B may constantly output a control signal while power is being supplied to it, or some switch may be provided, and the control signal may be outputted only when the switch is on. Alternatively, an arrangement may be provided such that by providing a camera, an infrared sensor, or the like, a control signal is outputted when the sensor has detected that a person has approached its vicinity.

Figure 38:
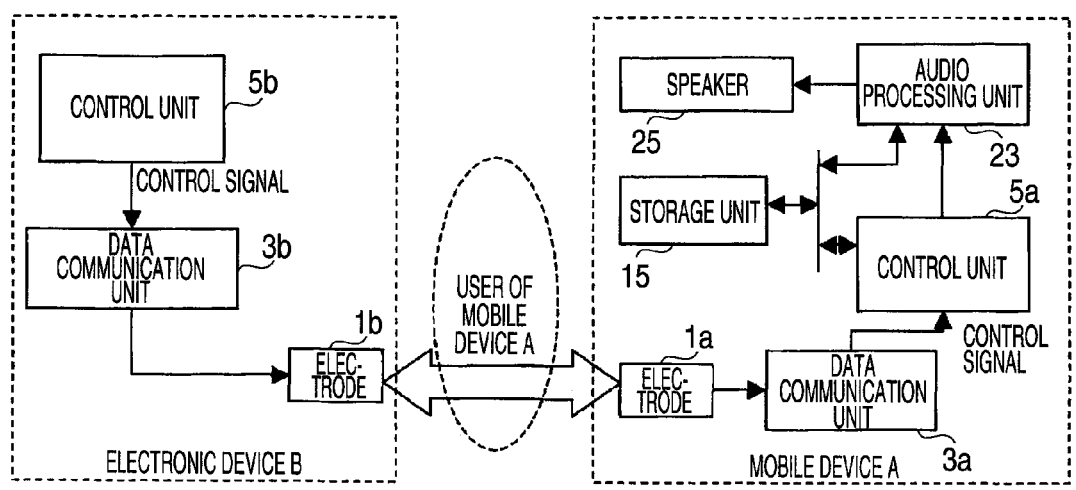
FIG. 38 is a block diagram of the electronic devices in accordance with the ninth embodiment.

It should be noted that, as shown in FIG. 37, the electronic device A may be a mobile device having the data communication unit $3a$, an LED (light emitting diode) 29, and the control unit $5a$. If this device is used, the user can be notified of a danger by the light emitted from the LED 29. Alternatively, as shown in FIG. 38, the electronic device A may be a mobile device having the data communication unit $3a$, the audio processing unit 23, the speaker 25, and the control unit $5a$. If this device is used, the user can be notified of a danger by a warning sound from the speaker 25.

An example of practical use of such a mobile device is similar to that of the eighth embodiment.

For example, it is assumed that the user is walking while reading an e-mail received by the mobile phone, and has then closely approached a descending stairway. Since the user is gazing at the screen, his or her attentiveness to the surrounding situation has decreased, and the user is not aware of the presence of the stairway nearby. If the user is still reading the e-mail upon closely approaching the stairway, the mobile phone receives the control signal being outputted from the electrode of the electronic device B installed on this side of the stairway, and the mobile phone is vibrated. The user becomes aware of the danger by the sudden vibration of the mobile phone, and it is possible to avoid the danger beforehand.

Thus, according to this embodiment, in the same way as in the eighth embodiment, it is possible to prevent a case in which a person who is operating the mobile phone or viewing the screen while walking has his or her attentiveness to the surroundings decreased for that reason, and falls into a dangerous situation. As a result, it is possible to provide a mobile device which reliably notifies by vibration only to the person who is operating or viewing the screen, i.e., the person who is holding the mobile device in his or her hand, whereas no display is given to the mobile device of a person who is not doing so even if he or she has closely approached a place requiring caution such as a stairway.

Thus, when the user who possesses the electronic device A is electromagnetically coupled to the electronic device A by such as holding the electronic device A in his or her hand, the electronic device receives a signal from the outside without the user in possession of it being intentional, and is thereby capable of executing a function useful or necessary for the possessor under that situation, or of receiving information or a service. Further, there is an advantage in that in a case where the user does not have the electronic device in hand, a signal is not received without providing a special setting.

In addition, if the invention is applied to an automobile, it is possible to provide a mobile electronic device which makes it possible to prevent driver inattention as the driver operates the electronic device such as a mobile phone during driving, in which the driver need not provide a special setting in that electronic device for carrying out such control after the starting or finishing of driving, and in which key operation is disabled only during driving without the driver becoming aware of it. Further, there is another advantage in that, as for the use of that mobile electronic device by another passenger, usual use is possible even during driving.

In addition, if the invention is applied to a body of public transportation, a movie house, or a theater, it is possible to turn off the sound without the user becoming bewildered or aware in an environment where surrounding people can be annoyed by the sound issued from electronic devices. Alternatively, it is possible to provide a mobile phone whereby, in places where the radio transmission and reception are prohibited on grounds that adverse effects may possibly be exerted on the surrounding people and electronic equipment by radio waves emitted from the mobile phones, the radio transmission and reception are deactivated without the user becoming aware, and in a case where the user has moved away from that place, the mobile phone can be reset without providing a detailed setting.

In addition, if the invention is applied to a place on this side of a stairway, a vicinity of a utility pole or a traffic light, or a vicinity of a construction site, it is possible to prevent a case in which a person who is operating the mobile phone or viewing the screen while walking has his or her attentiveness to the surroundings decreased for that reason, and falls into a dangerous situation. As a result, there is an advantage in that a danger can be reliably notified only to the person who is operating or viewing the screen, i.e., the person who is holding the mobile device in his or her hand, whereas no change occurs to the mobile device of a person who is not doing so even if he or she has closely approached a place requiring caution such as a stairway.

In addition, the above-described electronic device B can also be understood to be a control signal transmitting device for issuing a control signal for controlling the electronic device A possessed by a person. The control signal transmitting device has a data communication unit for effecting the transmission of a control signal on the basis of control by a control unit, and an electrode for human body communication for sending a control signal to the outside for the data communication unit. When the electrode of human body communication and the electrode of the electronic device A are electromagnetically coupled to each other through the human body, the transmission from the control signal transmitting device to the electronic device becomes possible, and the electronic device A is controlled on the basis of the control signal. As shown in FIG. 4, the control signal transmitting device sends the control signal to the outside at least predetermined intervals irrespective of the position of the electronic device A. Such a method of controlling the electronic device A and a control program for an electronic device for controlling the electronic device A are also included in the invention. This program is held in various memories, recording media, and the like in and outside the electronic device B, and is executed by the control unit which is a computer of the electronic device B.

This application is based on Japanese Patent Application filed on Mar. 14, 2005 (Japanese Patent Application No. 2005-071422), the contents of which are incorporated herein by reference.

Industrial Applicability

According to the electronic device controlling system and the control signal transmitting device electronic device in accordance with the invention, it is possible to receive data and a control signal from the outside without the user of the electronic device being intentional, and execute a function useful or necessary under that situation, or receive information or a service.

The invention claimed is:

1. An electronic device controlling system comprising:
a first electronic device including:
   a first data communication unit for effecting the reception of a control signal, the control signal including subject device information identifying at least one of a mobile phone, a personal digital assistant (PDA) and a mobile game device as a subject device, the control signal further including a command for the subject device;
   a first electrode for receiving the control signal for the first data communication unit from outside of the first electronic device;
   an operating unit;
   a first control unit that determines whether the first electronic device is the subject device or not from the subject device information included in the control signal, and, if the first electronic device is the subject device, executes the command included in the control signal;
   a system register storing information;
   a recording unit configured to save the information of said system register upon the first control unit determining that the first electronic device is the subject device;
   a timer configured to start counting to a predetermined value upon the first control unit determining that the first electronic device is the subject device;
   wherein in a case where an ensuing control signal is not received by the first electrode until said timer has counted to the predetermined value, a value of said system register is reset to a stored value; and
   wherein in a case where the ensuing control signal is received by the first electrode during the counting by the timer but before said timer has counted to the predetermined value, the timer is reset upon reception of the ensuing control signal by the first electrode and before said timer has counted to the predetermined value, and the counting is resumed upon resetting said timer; and
a second electronic device including:
   a second control unit;
   a second data communication unit for effecting the transmission of the control signal, which includes the subject device information and the command for the subject device, and said ensuing control signal on the basis of control by the second control unit; and
   an electrode for human body communication for sending the control signal, which includes the subject device information and the command for the subject device, and the ensuing control signal from the second data communication unit to the outside of the first electronic device,
wherein when the first electrode and the electrode for human body communication are electromagnetically coupled to each other, the first electronic device receives the control signal, which includes the subject device information and the command for the subject device, from the second electronic device via the electrode for human body communication.

2. The electronic device controlling system according to claim 1, wherein the first electronic device further has a display unit; and
wherein the first control unit does not output data to the display unit and disenables operation of the operating unit on the basis of the subject device information and the command in the control signal when the first electrode and the electrode for human body communication are electromagnetically coupled to each other.

3. The electronic device controlling system according to claim 1, wherein the first electronic device further has a display unit; and
wherein the first control unit displays a warning message on the display unit on the basis of the subject device information and the command in the control signal when the first electrode and the electrode for human body communication are electromagnetically coupled to each other.

4. The electronic device controlling system according to claim 1, wherein the first electronic device has at least one of an actuator, a light emitting element, and a speaker, and the first control unit issues an alarm by at least one of the actuator, the light emitting element, and the speaker on the basis of the subject device information and the command in the control signal when the first electrode and the electrode for human body communication are electromagnetically coupled to each other.

5. The electronic device controlling system according to claim 1, wherein the second electronic device further has a speed detecting unit and is installed in moving body having a motor; and
wherein the second control unit sends the control signal when it is detected by the speed detecting unit that the moving body is moving.

6. The electronic device controlling system according to 5, wherein the electrode for human body communication is installed in at least anyone of a seat portion of a driver's seat of the moving body, a backrest portion of the driver's seat, a safety belt of the driver's seat, a brake pedal, a steering wheel, and a gear.

7. The electronic device controlling system according to claim 1, wherein the first electronic device is a mobile phone, and wherein when the subject device information in the control signal identifies the mobile phone and the command in the control signal is a voice mail mode command, the first control unit automatically places the mobile phone into a voice mail mode.

8. The electronic device controlling system according to claim 1, wherein the electrode for human body communication is installed in a walkway at a top of a descending stairway, and wherein the first control unit outputs a warning on the basis of the subject device information and the command in the control signal when the first electrode and the electrode for human body communication are electromagnetically coupled to each other during human body communication through a pedestrian.

9. The electronic device controlling system according to claim 1, wherein the electrode for human body communication is installed in a walkway approaching a crossing, and wherein the first control unit outputs a warning on the basis of the subject device information and the command in the control signal when the first electrode and the electrode for human body communication are electromagnetically coupled to each other during human body communication through a pedestrian.

10. The electronic device controlling system according to claim 1, wherein the electrode for human body communication is installed in a walkway approaching a construction site, and wherein the first control unit outputs a warning on the basis of the subject device information and the command in the control signal when the first electrode and the electrode for human body communication are electromagnetically coupled to each other during human body communication through a pedestrian.

11. The electronic device controlling system according to claim 1, wherein the electrode for human body communication is installed in a walkway approaching a utility pole, and wherein the first control unit outputs a warning on the basis of the subject device information and the command in the control signal when the first electrode and the electrode for human body communication are electromagnetically coupled to each other during human body communication through a pedestrian.

* * * * *

UNITED STATES PATENT AND TRADEMARK OFFICE
CERTIFICATE OF CORRECTION

PATENT NO. : 8,368,527 B2
APPLICATION NO. : 11/813131
DATED : February 5, 2013
INVENTOR(S) : Hidekazu Kano et al.

It is certified that error appears in the above-identified patent and that said Letters Patent is hereby corrected as shown below:

In the Specifications:

Column 13, line 46, delete "S11" and insert --S111--

Signed and Sealed this
Twenty-eighth Day of May, 2013

Teresa Stanek Rea
*Acting Director of the United States Patent and Trademark Office*